United States Patent
Stancil et al.

(10) Patent No.: US 12,168,827 B2
(45) Date of Patent: Dec. 17, 2024

(54) LIGHT FILTER COATING AND METHOD OF PRODUCTION

(71) Applicant: HOWARD UNIVERSITY, Washington, DC (US)

(72) Inventors: Kimani A. Stancil, Baltimore, MD (US); James S. Hammonds, New York, NY (US)

(73) Assignee: Howard University, Washington, DC (US)

( * ) Notice: Subject to any disclaimer, the term of this patent is extended or adjusted under 35 U.S.C. 154(b) by 525 days.

(21) Appl. No.: 15/057,927

(22) Filed: Mar. 1, 2016

(65) Prior Publication Data

US 2016/0258049 A1    Sep. 8, 2016

Related U.S. Application Data

(60) Provisional application No. 62/127,193, filed on Mar. 2, 2015.

(51) Int. Cl.
*C23C 24/08* (2006.01)
*B82Y 30/00* (2011.01)
*G02B 1/00* (2006.01)

(52) U.S. Cl.
CPC .............. *C23C 24/08* (2013.01); *G02B 1/002* (2013.01); *B82Y 30/00* (2013.01)

(58) Field of Classification Search
CPC .......... C23C 24/08; G02B 1/002; B82Y 30/00
USPC ................................................ 427/162–169
See application file for complete search history.

(56) References Cited

U.S. PATENT DOCUMENTS

| | | | | |
|---|---|---|---|---|
| 2004/0007169 A1* | 1/2004 | Ohtsu | ............... | B82Y 30/00 117/84 |
| 2010/0028543 A1* | 2/2010 | Davis | ............... | B82Y 30/00 427/372.2 |
| 2014/0319563 A1* | 10/2014 | Cao | ............... | C08K 7/02 257/98 |
| 2016/0009552 A1* | 1/2016 | Ressier | ............... | B82Y 30/00 117/84 |

FOREIGN PATENT DOCUMENTS

WO    WO-2014136023 A1 *  9/2014    .........  B81C 1/00373

OTHER PUBLICATIONS

Singh et al, "Controlled semiconductor nanorod assembly from solution: influence of concentration, charge, and solvent nature", J. Mater. Chem. 2012, 22, 1562-1569, published Nov. 29, 2011 (Year: 2011).*

(Continued)

*Primary Examiner* — Michael G Miller
(74) *Attorney, Agent, or Firm* — Sughrue Mion, PLLC

(57) ABSTRACT

The present disclosure provides methods of applying a filtering coating to a substrate, comprising: depositing a solution on a surface of a substrate, wherein the solution comprises an organic solvent with nanorods dispersed within the solvent. Evaporation of the solution is allowed and/or controlled to increase a volume fraction of the nanorods in the solution as a function of the evaporation. Thus, an aligned deposit of the nanorods is provided as a function of the evaporation, wherein the aligned deposit of nanorods includes at least thousands of the nanorods with at least a majority of the nanorods aligned relative to a length of the nanorods.

24 Claims, 19 Drawing Sheets

(56) References Cited

OTHER PUBLICATIONS

Data Science Central, https://www.datasciencecentral.com/profiles/blogs/regression-analysis-how-do-i-interpret-r-squared-and-assess-the [accessed online Jul. 7, 2021] (Year: 2017).* r2 value meaning—https://www.google.com/search?q=r2+value+meaning [accessed online Jul. 7, 2021] (Year: 2021).*

Mukhopadhyay, "Nanoscale surface modifications to control capillary flow characteristics in PMMA microfluidic devices", Mukhopadhyay et al, Nanoscale Research Letters 2011, 6:411, 12 pages (Year: 2011).*

Jodat, "An experimental assessment of the evaporation correlations for natural, forced and combined convection regimes", Jodat et al. Proc. IMechE vol. 226 Part C: J. Mechanical Engineering Science, pp. 145-153, published May 26, 2011 (Year: 2011).*

S. Gupta et al.; "Self-Corralling" Nanorods under an Applied Electric Field; Nano Letters; 6; 2006; pp. 2066-2069.

A. M. Hung et al.; "Solvent Based Assembly of CdSe Nanorods in Solution"; Langmuir; 27; 2011; pp. 12322-12328.

G. Mertens et al.; "Shift of the photonic band gap in two photonic crystal/liquid crystal composites"; Applied Physics Letters; 80; 2002; pp. 1885-1887.

T. J. White et al.; "Optically reconfigurable color change in chiral nematic liquid crystals based on indolylfulgide chiral dopants"; Journal of Materials Chemistry, Issue 12, 2012, pp. 5751-5757.

L. S. Li et al.; "Semiconductor Nanorod Liquid Crystals and their Assembly on a Substrate"; Advanced Materials, 15, 2003, pp. 408-411.

R. H. Nilson et al.; "Steady Evaporating Flow in Rectangular Microchannels"; International Journal of Heat and Mass Transfer, 49, 2006, pp. 1603-1618.

S. W. Tchikanda et al.; "Modeling of Pressure and Shear-Driven Flows in Open Rectangular Microchannels"; International Journal of Heat and Mass Transfer, 47, 2004, pp. 527-538.

P. F. Man et al.; "Microfabricated Capillarity-Driven Stop Valve and Sample Injector"; IEEE The Eleventh Annual International Workshop on Micro Electro Mechanical Systems, 1998, pp. 45-50.

R. M. Grechishkin et al.; "Digital Recording and Analysis of Optical-Polarization Images of a Domain Structure"; Measurement Techniques, 42, No. 11, 1999, pp. 1043-1046.

L. S. Li et al.; "Origin and Scaling of the Permanent Dipole Moment in CdSe Nanorods"; Physical Review Letters, 90, 2003, pp. 097402-097405.

J. Ilavsky; "Nika: software for two dimensional data reduction"; Journal of Applied Crystallography, 45, 2012, pp. 324-328.

V. M. Ugaz et al.; "X-ray scattering investigation of highly concentrated poly (benzylglutamate) solutions under shear flow"; Journal of Rheology, 42, 1998, pp. 379-394.

J. He et al.; "Drying Droplets: A Window into the Behavior of Nanorods at Interfaces"; Small, 3, No. 7, 2007, pp. 1214-1217.

K.M. Ryan et al.; "Electric-Field-assisted assembly of perpendicularly oriented nanorod superlattices"; Nano Letters; 6; 2006; pp. 1479-1482.

J.L. Baker et al.; "Device-Scale Perpendicular Alignment of Colloidal Nanorods"; Nano Letters; 10; 2010; pp. 195-201.

C. Querner et al.; "Millimeter-Scale Assembly of CdSe Nanorods into SmecticSuperstructures by Solvent Drying Kinetics"; Advanced Materials; vol. 20; Issue 12; Jun. 18, 2008; pp. 2308-2314.

D. Erickson et al.; "Nanofluidic tuning of photonic crystal circuits"; Proceedings of SPIE Integrated Optics: Devices, Materials, and Technologies XI 2007, 6475, 2007, pp. 647513-647523.

Q. Liu et al.; "Self-Alignment of Plasmonic Gold Nanorods in Reconfigurable Anisotropic Fluids for Tunable Bulk Metamaterial Applications"; Nano Letters, 10, 2010, pp. 1347-1353.

A. B. Golovin et al.; "Electrically reconfigurable optical metamaterials based on orientationally ordered dispersions of metal nano-rods in dielectric Fluids"; Proceedings of SPIE Liquid Crystals XIV 2010, 7775, 2010, pp. 777502-1-77502-14.

A. B. Golovin et al.; "Electro-Optic Effects in Colloidal Dispersion of Metal Nano-Rods in Dielectric Fluid"; Materials, 4, 2011, pp. 390-416.

A. B. Golovin et al.; "Electrically reconfigurable optical metamaterial based on colloidal dispersion of metal nanorods in dielectric fluid"; Applied Physics Letters, 95, 2009, pp. 254104.

L. S. Li et al.; "Semiconductor Nanorod Liquid Crystals"; Nano Letters, 2, 2002, pp. 557-560.

L. S. Li et al.; "Isotropic liquid crystalline phase diagram of a CdSe nanorod solution"; Journal of Chemical Physics, 120, 2004, pp. 1149-1152.

M. A. Bates et al.; "Influence of poly-dispersity on the phase behavior of colloidal liquid crystals: A Monte Carlo simulation study"; Journal of Chemical Physics, 109, 1998, pp. 6193-6199.

E. Rabani et al.; "Drying-mediated Self-Assembly of Nanoparticles"; Nature, 426, 2003, pp. 271-274.

Y. Cui et al.; "Integration of Colloidal Nanocrystals into Lithographically Patterned Devices"; NanoLetters, 4, 2004, pp. 1093-1098.

J. A. Liddle et al.; "Litho-graphically directed self-assembly of nanostructures"; Journal of Vacuum Science Technology B, 22, 2004, pp. 3409-3414.

M. Kleman, M et al.; Soft Matter, Springer-Verlag, 2003.

L. Manna et al.; "Synthesis of Soluble and Processable Rod-, Arrow-, Teardrop-, and Tetrapod-Shaped CdSe Nanocrystals"; Journal of the American Chemical Society, 122, 2000, pp. 12700-12706.

A. Hexemer et al.; "A SAXS/WAXS/GISAXS Beamline with Multilayer Monochromator"; XIV International Conference on Small-Angle Scattering (SAS09) IOP Publishing Journal of Physics: Conference Series, 247, 2010, 012007.

L. Onsager et al.; "The Effects of Shape on the Interaction of Colloidal Particles"; Annals New York Academy of Sciences, 51, 1949, pp. 627-659.

* cited by examiner

LIGHT FILTER COATING AND METHOD OF PRODUCTION

This application claims the benefit of U.S. Provisional Application No. 62/127,193, filed Mar. 2, 2015, for Stancil et al., and entitled LIGHT FILTER COATING AND METHOD OF PRODUCTION, which is incorporated in its entirety herein by reference.

TECHNICAL FIELD

The present disclosure relates generally to light filters. More specifically, the present disclosure relates to light filter coatings.

BACKGROUND

Engineering materials and/or the application of such materials to enhance optical and/or electronic properties is a constant thrust in industry. There are numerous industrial applications for such enhanced materials. Further, the engineering and development continues to develop materials, even at small scales, such as micro and nanometer scales.

Further development in these micro and/or nanometer scales can provide significant benefits to materials and industrial applications. Substantial research continues to be performed in these areas.

SUMMARY

Example methods of applying a filtering coating to a substrate include depositing a solution on a surface of a substrate, wherein the solution comprises an organic solvent with nanorods dispersed within the solvent. The nanorods typically are cadmium selenide (CdSe) nanorods. In one aspect, the method includes allowing evaporation of the solution to increase a volume fraction of the nanorods in the solution as a function of the evaporation. An aligned deposit of the nanorods is provided as a function of the evaporation, wherein the aligned deposit of nanorods includes at least thousands of the nanorods with at least a majority of the nanorods aligned relative to a length of the nanorods.

Further, some embodiments provide methods of applying an optical filtering coating to a substrate including depositing a solution on a surface of a substrate, wherein the solution comprises an organic solvent with nanorods dispersed within the solvent. Evaporation of the solution is allowed to increase a volume fraction of the nanorods in the solution as a function of the evaporation, which achieves alignment of the nanorods in less than 10 minutes from deposition of the solution on the surface per 0.10 ml of solution deposited on the substrate. The aligned deposit of the nanorods is provided as a function of the evaporation, wherein the aligned deposit of nanorods includes at least thousands of the nanorods with at least a majority of the nanorods aligned relative to a length of the nanorods.

Figure 1:
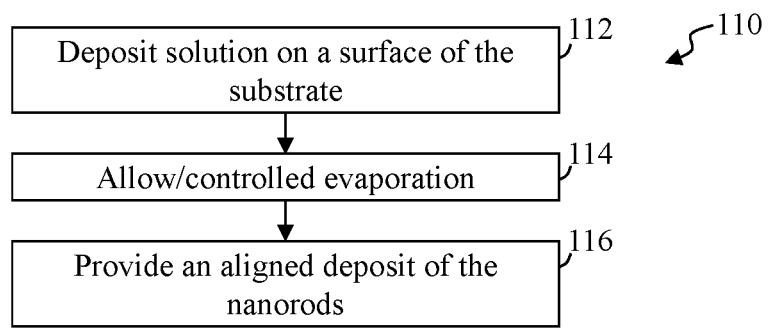
FIG. 1 illustrates a simplified flow diagram of an exemplary process of applying a filter coating to a substrate, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

There are numerous advantages to engineered materials that can be configured to enhance optical and/or electronic properties. Some embodiments provide one or more materials that can be applied to a surface and/or substrate to achieve desired optical and/or electronic properties. Further, the application of these materials can provide optically reconfigurable materials. Still further, some embodiments allow for the tuning of optical and/or photonic behavior of at least surface materials by controlling, for example, the dielectric contrast and/or the spatial variation of the surface's refraction index. Some embodiments achieve and/or enhance tuning, in part, by the alignment of nanorods over a surface or substrate.

Some previous methods attempting to provide tunable photonic crystals require precise control of temperature to change the liquid crystal phase and refraction index of the material. Other methods using materials that form liquid crystal phases upon the addition of a solvent (i.e., lyotropic) or concentration sensitive material assemblies typically do not lend towards relatively quick, readily and/or easy tuning because of kinetic constraints in achieving the desired phase. Kinetic constraints, in at least some implementations, can include temperature, pressure air flow, and other environmental or physical factors that may lead to changes in evaporation conditions. Further, kinetic constraints may additionally include dynamics internal to nanomaterial solution that relate to entropy and use of available energy. Such previous methods typically require multiple days to weeks to achieve emergent phases, for example, with high weight percent cadmium selenide (CdSe) nanorod solutions.

Alternatively, some present embodiments can achieve desired alignment within less than a day, and in many instances in less than an hour. Further, some embodiments tune a refraction index of a surface layer of material through nanorod type, alignment, and/or interaction tailoring. For example, some embodiments control a deposition and organization of nanorods, which can provide a window, using adsorption modeling, into Lyotropic aspects of changing phase or alignment behavior.

FIG. 1 illustrates a simplified flow diagram of an exemplary process 110 of applying a filter coating to a substrate, in accordance with some embodiments. In step 112, a solution is deposited on a surface of the substrate. The solution comprises nanorods dispersed in a liquid. In some embodiments the liquid comprises a solvent, an organic solvent or other such suitable liquids. For example, suitable liquids include organic solvents that readily evaporate at relatively low temperatures (e.g., less than about 111° C., and typically at about room temperature), provide a desired solvent contact angle relative to a substrate, and achieves a good blending of the nanorods and the solvent, and other such qualities (e.g., solvate ligand end not attached to nanoparticle, solvate nanoparticle without ligand, evaporates where boiling point and volatility influence resulting evaporation rate, etc.). In some implementations, an organic solvent is selected to provide a contact angle that is less than about 90°. Again, the solution includes the selected solvent and selected nanorods dispersed within the solvent. The nanorods are typically selected to achieve a desired optical and/or light filtering. For example, some embodiments intend to provide for infrared and/or near-infrared light filtering and/or absorption, and utilize cadmium selenide (CdSe) nanorods. Some embodiments utilize one or more other nanorods to achieve desired filtering and/or absorption within a known bandwidth. The application of the optical or light filter coating, in some instances, can be considered a painting of the surface with the filter coating.

In step 114, evaporation of the solution is allowed and/or controlled to increase a volume fraction of the nanorods in the deposited solution as a function of the evaporation. The evaporation can be controller through various factors (including, for example, ligands attached to nanorod surface), such as but not limited to the organic solvent or solvents used, the nanorods infused within the solvent, a concentration of the nanorods within the solvent, the ambient temperature, temperature of the solution, rate of flow of air and/or other gas or gases across the deposited solution and/or other such aspects and factors. Some embodiments may apply different hood face velocities in part to control a rate of evaporation. Similarly, some embodiments ensure level substrates in attempts to ensure substantially level distribution of nanorods. In step 116, an aligned deposit of the nanorods is provided as a function of the evaporation. Typically, the aligned deposit of nanorods comprises at least thousands of the nanorods with at least a majority of the nanorods aligned relative to a length of the nanorods. In some applications, for comparable volume fractions improved alignment is achieved as a function of aspect ratio, which may at least in part be quantified with order parameters and/or alignment factor calculations as described herein. Further, in some implementations, the alignment of the nanorods is typically achieved in less than one hour, and in some instances is achieved is less than 10 minutes from the time of the deposition of the solution on the surface per 0.10 ml of solution deposited on the substrate. Additionally, in some embodiments, the evaporation is often completed within less than a day, and often less than 30 minutes per 0.10 ml of solution deposited on the substrate, which is dramatically faster than other evaporation techniques attempting to achieve a filtering layer. Such alignment is achieved, at least in part, due to strong dipolar interactions between nanorods and solvation, which is typically dependent on both ligand and solvent choice. As introduced above, many other evaporation techniques take multiple days or weeks, and as such, the evaporation completion in some present embodiments is achieved in less than 5% the time of these other techniques, and in some instances less than 0.3% of the time of other techniques.

Many nanorod synthesis variations produce polydisperse or non-uniform samples with nanorods of varied sizes in the dispersed phase (where polydisperse samples include a collection of different sizes of nanorods). It has been recognized that increases in positional order observed in smectic assemblies (having both orientational and positional order) of well-defined layers with nanorods generally aligned along a direction result from high monodispersity with nanorods of relatively uniform size. Polydisperse samples can limit observations of the smectic phase, and often broaden the phase region for isotropic-nematic (I-N) coexistence. In some implementations, this can be a practical benefit because device-scale integration using orientational nanorod alignment may proceed without waiting for synthesis techniques to advance.

Optically selective and scalable devices based on nanorod shape and orientation can provide an optical filter with a thin film coating. For example, some embodiments provide a thin film and/or nanomaterial film that can selectively control single or multiple refraction indexes through a type of nanorod, nanorod material density, and other such factors. In addition to preferential absorption and emission, the use of nanorods can permit the use of two refraction indexes, the extraordinary and ordinary refraction indices, $n_e$ and $n_o$, respectively. The difference between these indices, $\Delta n = n_e - n_o$, is commonly known as optical birefringence.

Optically birefringent wide-bandgap semiconducting materials (e.g., cadmium selenide (CdSe), cadmium sulfide (CdS), etc.) may tailor optical responses in visible light for solid state lighting applications. In some instances, their nanorod assembly on substrates provides potential device assemblies of filters, absorption layers, and/or other such effects for a variety of industrial, consumer electronic, military, and other such applications.

Accordingly, the nanorods typically are selected to achieve a desired filtering and/or absorption. For example, some embodiments utilize cadmium selenide (CdSe) nanorods to achieve a filter layer or coating that can provide infrared and/or near-infrared filtering and/or absorption. The liquid and/or solvent is typically selected at least in part based on the type and/or make-up of the nanorods and to achieve the desired evaporation and/or evaporation time. In some embodiments, the solvent comprises an organic solvent, such as but not limited to methylcyclohexane. Other solvents may be used, such as but not limited hexane, cyclohexane, toluene, and other such solvents. The concentration of the nanorods within the solvent can further affect the filter coating and/or evaporation. Accordingly, in some embodiments, preselected weighted quantity of the prepared nanorods are dispersed in a predefined volume of the solvent producing the solution. For example, in some embodiments, the amount of nanorods added to the solvent is less than 4% by weight. Some embodiments utilize solutions having larger nanorod weight percentages. It is noted, however, that deposit volume and/or evaporation rates may play limiting roles in assembly and/or the nanorod weight percentages (e.g., evaporation rates typically limit the time that nanorods in solution have to associate, and relatively high rate of evaporation have provided less chance of order or alignment on a large scale (mm)).

Similarly, structure, size, and/or shape of the nanorods can affect the alignment and/or deposition of the nanorods onto the substrate. In many embodiments, the nanorods in the solution have an average length of less than 70 nm. Accordingly, the nanorods can be selected to achieve a desired filtering result. Further, in some embodiments, the optical filtering effect resulting from the aligned deposit of the nanorods can be tuned. The tuning, in some embodiments, includes identifying Lyotropic aspects corresponding to one or more types of potential nanorods. A predicted alignment of each of the one or more types of potential nanorods can be established as a function of the Lyotropic aspects of the one or more types of potential nanorods. Based on the predicted alignment, one or more of the potential nanorods can be selected to achieve a desired filtering and/or absorption for an intended bandwidth and/or bandwidths. Further, as described in more detail below, some embodiments establish a predicted alignment through an estimation of an isotropic-nematic phase coexistence based on a small angle x-ray scatting characterization of aligned nanorods. Still further, some embodiments determine the establishment of a predicted alignment in part with respect to minimizing interfacial energy for aligning near an interfacial boundary (e.g., solid-liquid-vapor contact line with regular interparticle interactions in bulk like dipole-dipole and Van der Waals interactions).

Further, some embodiments utilize an estimated onset of nanorod alignment instigated based in part on dipolar character of the nanorods (e.g., CdSe nanorods). The estimation can combine small angle x-ray scattering (SAXS), profilometry, and/or Langmuir adsorption to analyze multiple different dry nanorod deposits, where the aspect ratio of each nanorod is defined by a length of the nanorod divided by a width of the nanorod. Langmuir adsorption is generally coincident with alignment because it predicts that more nanorods are deposited from solution as the volume fraction increases. The volume fraction increase can increase the chance of nanorod alignment in solution and in the deposits. In some implementations, when alignment begins may be identified by tracing the Langmuir isotherm curve, as further described and graphically illustrated herein.

Figure 2:
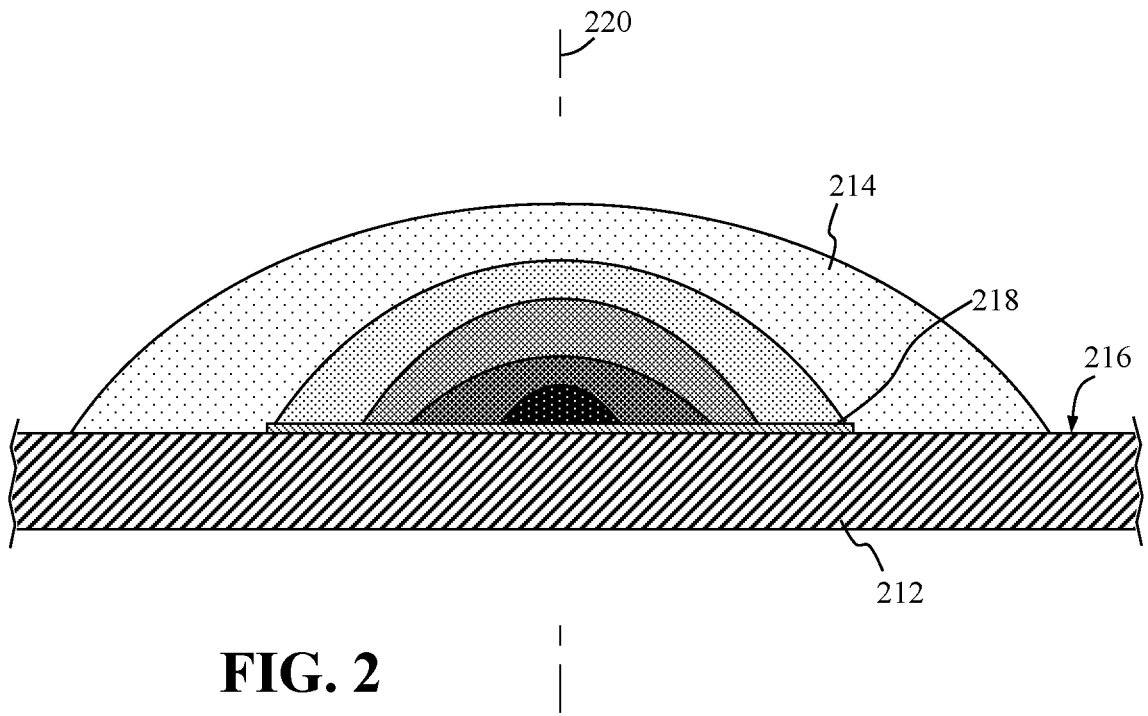
FIG. 2 shows a simplified cross-sectional view of a substrate with an exemplary evaporation progression of a solution deposited onto a surface of the substrate resulting in the deposit of a filter and/or absorption coating or layer of nanorods, in accordance with some embodiments.

FIG. 2 shows a simplified cross-sectional view of a substrate 212 with an exemplary evaporation progression of a solution 214 deposited onto a surface 216 of the substrate resulting in the deposit of a filter and/or absorption coating or layer of nanorods 218 (sometimes referred to as the filter coating or filter coating assembly), in accordance with some embodiments. As an example, the solution can comprise a dilute CdSe nanorod-methylcyclohexane solution, with less than 3% by weight of the CdSe nanorods. Other types of nanorods may alternatively or additionally be utilized, such as cadmium sulfide (CdS) and other semiconducting nanorods. Some embodiments further control and/or induce evaporation by maintaining a flow of one or more gases (e.g., an airflow) over the surface of the substrate 212. For example, in implementations, an airflow over the surface is maintained between 80 and 100 feet per minute (fpm).

In some embodiments, the deposition and evaporation of the nanorods solution 214 achieves an alignment of the nanorods generally along a periphery of the deposited solution as a periphery of the solution recedes across the substrate (e.g., toward a central area or axis 220 of the deposited solution) during evaporation with the aligned nanorods aligning generally parallel with an exterior perimeter of the deposited solution 214. Further, in some instances, the alignment of a majority of the nanorods comprises a gradient of alignment with an increased alignment of the nanorods approaching a central area (e.g., about a central axis 220) of the aligned deposit of the nanorods. It has been identified that in implementing an evaporation of dilute CdSe nanorod-methylcyclohexane solutions (<3 wt. %), there was solute retention at least until the final drying stages. It was further identified that when solubility limits are reached (in a model deposit volume of the deposited solutions periphery, such as a drop), nanorods precipitate steadily while the remaining solution concentrates. Precipitation occurs as the substrate-solution vapor contact line recedes, which in some instances the substrate-solution vapor contact line uniformly recedes. In some embodiments, the evaporation of the solution induces depositing of the aligned nanorods along a periphery of the deposited solution as a periphery of the solution recedes across the substrate during evaporation with the aligned nanorods aligning generally parallel with an exterior perimeter of the deposited solution.

Figure 3A:
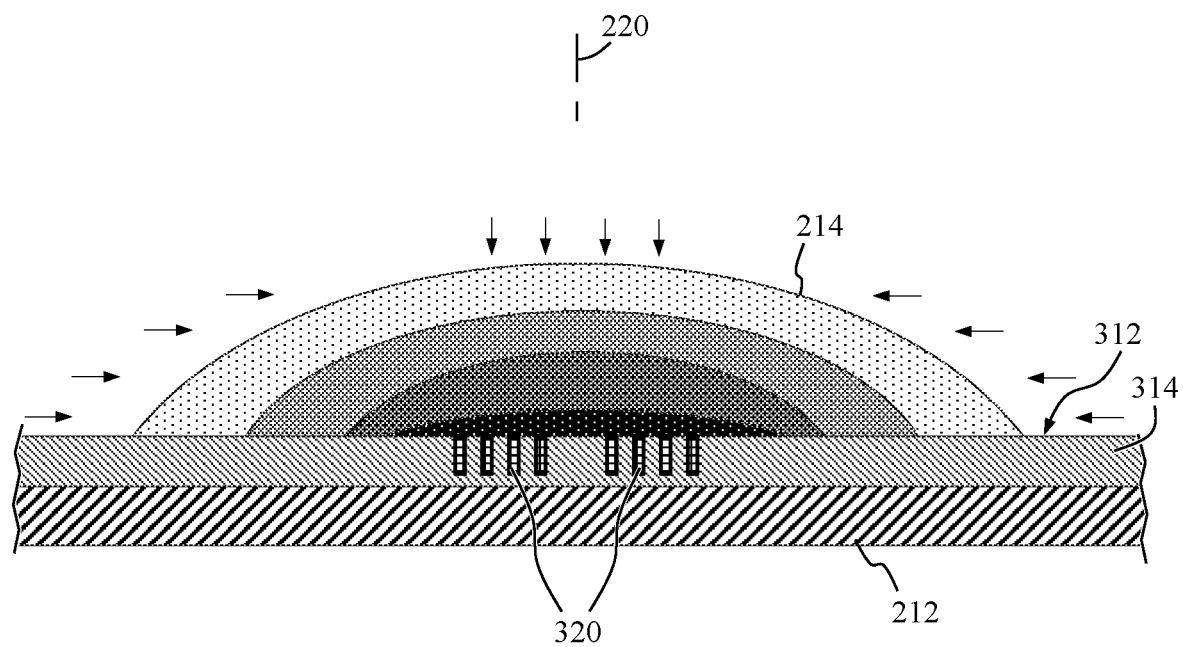
FIG. 3A shows a simplified cross-sectional view of a substrate with an exemplary evaporation progression of a solution deposited onto one or more microchannels of a substrate, in accordance with some embodiments.
Figure 3B:
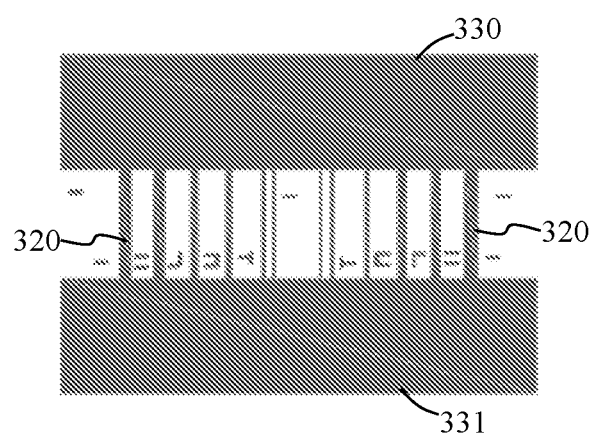
FIG. 3B shows an overhead view of microchannels formed in a surface in an exterior layer and/or a substrate with one or more reservoirs cooperated with each microchannel, in accordance with some embodiments.

In other embodiments, a filter coating 218 is established within one or more microchannels formed on and/or within a substrate, or in a layer formed on a substrate. FIG. 3A shows a simplified cross-sectional view of a substrate 212 with an exemplary evaporation progression of a solution 214 deposited onto a surface 312 of an exterior layer 314 formed on the substrate 212, and comprising one or more microchannels 320, in accordance with some embodiments. Further, in some instances, the microchannels are formed in the exterior layer. Controlling and/or allowing the evaporation of the solvent results in the deposit of a filter coating 218 of nanorods at least within the microchannels. FIG. 3B shows an overhead view of the microchannels 320 formed in the surface in the exterior layer and/or the substrate 212 with one or more reservoirs 330-331 cooperated with each microchannel, in accordance with some embodiments. In the embodiment shown in FIG. 3B, a reservoir may be formed at one or both ends of one or more microchannels. A volume of solution is deposited over the microchannels 320 and/or into one or more of the reservoirs 330-331.

Evaporation is allowed and controlled to achieve an alignment of nanorods at least within the one or more microchannels. Again, evaporation is implemented to increase the nanorod volume fraction toward a nematic phase to quickly align nanorods on device scales. For example, some embodiments deposit the solution in a first reservoir 330 formed at a first end of one or more microchannels each having a width of less than 200 µm. In some instances, the solution includes nanorods with an average length greater than 25 nm and with an aspect ratio of greater than 10. The alignment is provided with the lengths of a majority of the nanorods being aligned substantially parallel with a length of the one or more microchannels.

A combination of phase behavior and wetting can be applied to limit the influence of less controllable factors like turbulence or the range of contact angles accessible to a fluid during evaporation in a microchannel. Further, some embodiments utilize and/or take advantage of the Lyotropic phase assisted alignment, wetting, and/or capillarity in ordering nanorods over relatively large length scales (at least with respect to the size of the nanorods). The dilute solution comprising the nanorods in some implementations is drop-casted, and relatively rapid evaporation is allowed achieving nematic assembly in and/or on microchannels 320 over relatively short periods of time, such as less than a day, in many instances less than an hour. For example, some embodiments utilizing methylcyclohexane solvent and CdSe nanorods can achieve nanorod alignment in less than 4 minutes with a set completion time of about 10 minutes, which is similar to a timescale used in preparing some transmission electron microscope (TEM) grids. Some embodiments may apply one or more sealants or coatings over the aligned nanorods to maintain a position of the filtering coating and/or enhance the stability of the filtering coating. For example, a spray can be used that does not initiate additional flow or solvation in a previously dry assembly.

The preparation of the solution can be important, in some implementations, in achieving the desired nanorod alignment and deposited filter coating 218. In some embodiments, the nanorods are prepared prior to combining the nanorods with the solvent to obtain batches of the solution comprising the solvent and the desired amount of nanorods. For example, in preparing the nanorods in some embodiments, a first stock of selected nanorods is cleaned. The cleaning, in some implementations, can include repeating a series of dispersions of the first stock in a solvent, such as hexane, followed by centrifuging to produce cleaned nanorods. The cleaned stock can then be subjected to a preparation process to obtain prepared clean nanorods. In some embodiments, the preparation process can include repeating multiple times a series of: dispersing the cleaned nanorods in a final solvent (which is to be used in the deposition of the nanorods onto the substrate) producing a preliminary solution, centrifuging the preliminary solution and transferring the supernatant of the preliminary solution following the centrifuging. Again, the preparation process can be repeated multiple times to obtain prepared nanorods. For example, the cleaned nanorods can be dispersed into methylcyclohexane producing the preliminary solution of nanorods in methylcyclohexane, centrifuging the preliminary solution of nanorods and methylcyclohexane, and transferring the supernatant of the preliminary solution following the centrifuging. A selected or predefined amount of the prepared nanorods, which in some instances is defined by a percentage by weight, can then be dispersed into a predefined volume of the intended solvent (e.g., methylcyclohexane or other such organic solvent) to produce one or more batches of the solution comprising the solvent and the nanorods. In some embodiments, the preparation of the nanorods further includes a separation of the nanorods based on an average aspect ratio. Accordingly, multiple samples of prepared nanorods can be obtained, with different average aspect ratios. The different samples can be used depending on an intended result, such as a desired filtering and/or absorption.

EXAMPLE 1

In some exemplary embodiments, CdSe nanorods are initially obtained and/or produced. In some instances, the CdSe nanorods are synthesized, for example, with a combination of Tri-Octyl Phosphine Oxide (TOPO), Hexyl Phosphonic Acid (HPA), and Tetra-Decyl Phosphonic Acid (TDPA) ligands using dimethyl cadmium ($CdMe_2$) precursor in accordance with known established procedures or recipes. In other instances, the nanorods may be obtained from a third party source. The nanorods are cleaned and prepared, and a predefined amount of the prepared nanorods (e.g., low weight percent (<3 wt. %)) are combined with a predefined volume or amount of solvent (e.g., a first amount of prepared CdSe nanorods are combined with about 0.05 ml of methylcyclohexane solvent) to achieve one or more batches of the prepared solution. Again, different batches or samples of prepared solutions can have nanorods with different average aspect ratios (e.g., a first batch can have nanorods with an average aspect ratio of about 3.6, a second batch with nanorods having an average aspect ratio of about 6.3, a third batch with nanorods having an average aspect ratio of about 11.7, and a fourth batch with nanorods having an average aspect ratio of about 12.4). Table 1 below illustrates examples of samples of CdSe nanorods used to make batches of the solution.

TABLE 1

CdSe nanorod batch statistics

| Aspect ratio (L/D) | D (nm) | L (nm) | wt. % |
|---|---|---|---|
| 3.6 ± 0.7 | 3.8 ± 0.7 | 13.2 ± 1.6 | 0.83 |
| 6.3 ± 1.5 | 3.7 ± 0.6 | 23.0 ± 5.1 | 2.10 |
| 11.7 ± 3.3 | 4.0 ± 0.8 | 44.8 ± 9.4 | 0.84 |
| 12.4 ± 3.5 | 3.7 ± 0.7 | 45.1 ± 11.6 | 2.96 |

Figure 4:
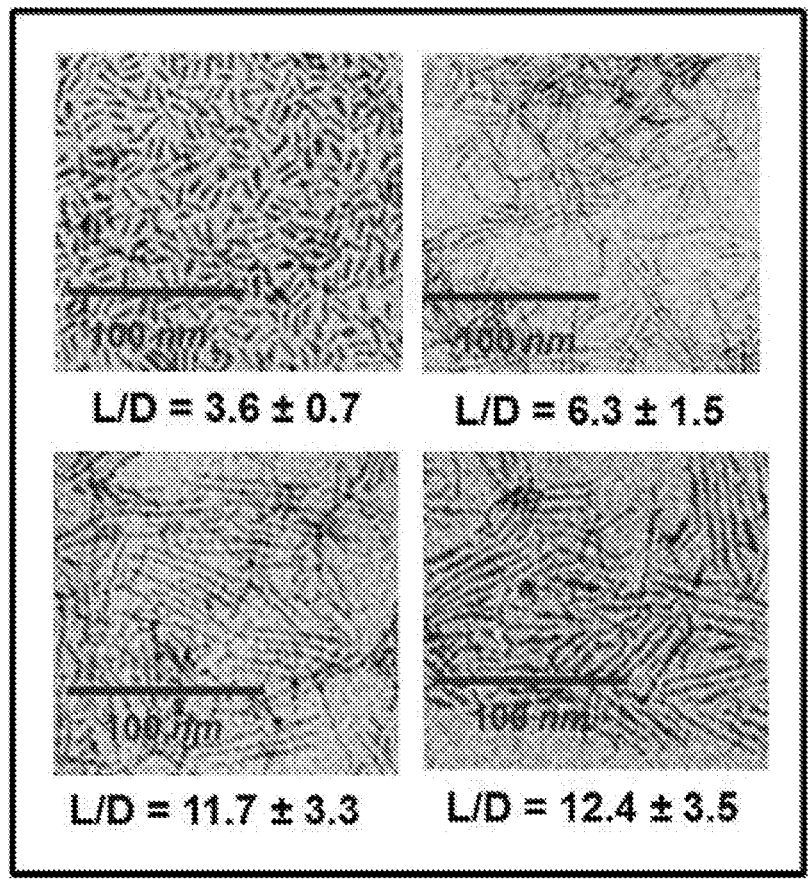
FIG. 4 illustrates example TEM micrographs of batches of nanorods having differing aspect ratios.

In some instances, the nanorod statistics were obtained using Image Pro software and a Tecnai G2 S-Twin transmission electron microscope (TEM, 200 kV). The TEM statistics in Table 1 include the width (D), length (L), and aspect ratio (L/D) for batches of nanorods. FIG. 4 illustrates example TEM micrographs of batches of nanorods identified in Table 1. In some instances, the aspect ratio was determined based on averages, while in other instances, aspect ratio was determined for each nanorod sampled.

One or more volumes of the one or more prepared solutions are deposited onto a surface 216 of a substrate 212. The volumes may be distributed over the surface, and typically are spaced apart such that the volumes do not touch. For example, in some embodiments, volumes of approximately 0.05 ml are deposited on a level quartz substrate, or on a coated substrate (e.g., an epoxy-based negative photoresist, such as SU-8 coated surface of a quartz substrate, which may be applied using photolithography or the like). As a further example, the quartz substrate may be a quartz wafer from HOYA Corporation, such as the 4 W 55, having a diameter of about 100.0 mm (+/−0.3 mm) with a thickness of about 525 μm (+/−50 μm), or other relevant substrates.

During evaporation, competing solvent and nanoparticle phase transitions progress under nonequilibrium conditions with changes on relatively large length scales, which may at least in part be due to interparticle interactions. A completed evaporation experiment produces a range of potentially accessible volume fractions that can depend on the initial solution preparation, and the rate or control of the evaporation conditions. Again, some embodiments achieve a tuning of a refractive index (e.g., the CdSe solution's refraction index) by selecting the nanoparticle's volume fraction and/or percentage by volume. A snapshot of the drying process can be considered to illustrate that solute deposits, which often occur just prior to contact-line and fluid recession, occupy a model volume smaller than but in open contact with the bulk volume of the deposited volume of solution.

In some implementations, as illustrated in FIG. 2, the nanorods and/or nanosolute can be driven into the model volume by a dynamic combination of fluid flows and surface forces. Interparticle interactions increase as more nanorods occupy the same model volume. Further, some embodiments take into consideration dipole-dipole interactions to tune the interparticle forces by size and shape because the CdSe dipole moment, $u_z$, generally scales linearly with the nanoparticle or nanorod volume (e.g., $u_z$=(0.19 uC/cm$^2$) (Vnanorod). Additionally or alternatively, some embodiments utilize a Langmuir adsorption isotherm to model a series of snapshots of the depositing of the nanorods. Based on the modeling of the series of snapshots, reaction constants can be derived that depend on the particle interaction energies.

Evaluations of nanorod filter coatings confirm the nanorod alignment to achieve the tuned optical filtering and/or absorption. In some implementations, the quartz substrate or the SU-8 coated quartz substrate were selected to allow for desired evaluation of the applied filter coating 218 of nanorods. For example, some embodiments preform measurements of optical birefringence and/or small angle x-ray scattering (SAXS) on one or more of the deposited filter coatings 218.

Figure 5:
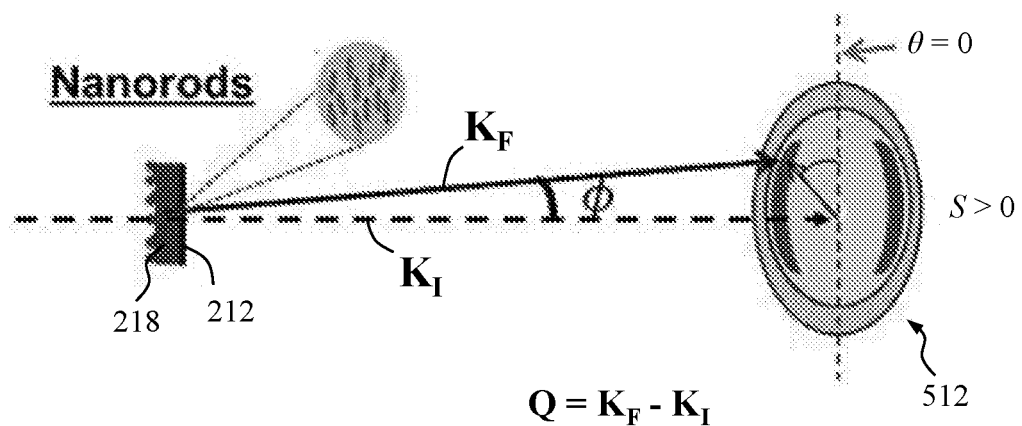
FIG. 5 shows a simplified cross-sectional view of a filter coating subject to a Small Angle X-ray Scan (SAXS) evaluation through a two-dimensional (2-D) detection of the scattering of an X-ray incident beam through the filter coating, in accordance with some embodiments.

FIG. 5 shows a simplified cross-sectional view of a filter coating 218 subject to an SAXS evaluation through a two-dimensional (2-D) detection 512 of the scattering of an X-ray incident beam $K_I$ through the filter coating, in accordance with some embodiments. In this orientation, the filter coating 218 and substrate 212 is substantially perpendicular to the incident x-ray beam (wave vector, $K_I$). The resulting x-ray scatters (illustrated in FIG. 5 by a final wave vector, $K_F$) at an angle ϕ from the incident beam direction. Using SAXS evaluation, inter-nanorod spacing and orientational order can be determined based on a scattering vector ($Q=K_F-K_I$). It is also confirmed that more nanorod material is deposited at a periphery of the deposited volume of solution as the solution concentrates through the evaporation. In some embodiments, the resulting nanorod alignment of at least a majority of the nanorods is generally perpendicular to diameter scans performed on circular filter coating assemblies, which establishes a positive order (or alignment) parameter, S>0 (explained in Equation 1 below), in which dried nanorods align parallel to the fluid contact line as the contact line progresses or recedes along the substrate surface during evaporation. In some instances, the model deposit volume is considered to be no smaller than the SAXS scattering volume established by the x-ray beam cross-section and a nanorod film height. For example, SAXS evaluation was performed using a beam with cross-sectional area, ASAXS=100 μm×700 μm, at the Lawrence Berkeley Laboratory Advanced Light Source (ALS) beamline, ALS BL 7.3.3. Additionally, optical birefringence was observed using a NIKON E600 POL microscope. Further, the water contact angles for the quartz substrate and the SU-8 surfaced quartz substrate were measured, using a KRUSS instrument, at about 25° and 85°, respectively.

Typically, precipitation (e.g., "coffee staining" models) consider solute precipitation to be a generally random fluid driven process, and pinning of the contact line tends to result in most solute occupying a dense outer ring. The solute deposits can be considered as a combination of random and ordered solute. Alternatively, through the use of the CdSe nanorod and solvent solution and the implemented evaporation, it is believed that CdSe nanorods experience attractive interactions resulting at least in part from the anisotropic polarizability and nanorod dipole moment. Consideration of Keesom interaction (see Atkins, P.; de Paula, J.; Atkins' Physical Chemistry 8th edition; W. H. Freeman, 2006, which is incorporated in its entirety herein by reference) shows, in accordance with some embodiments, that the dipole-dipole interaction likely prevails in forming nanorod aligned filter coating assemblies. Evaluation of both hydrophilic substrates (e.g., quartz substrate) and hydrophobic substrates (e.g., quartz with SU-8 layer), allows for the examination of the potential for using hydrophilic/hydrophobic cross patterning toward sub-60 nm nanocrystal confinement. It is further believed that the substrates differentiate wetting conditions, but as a secondary influence to the average dipole-dipole interaction's influence on nanorod alignment and the resulting filter coating. The below details of the evaluation of filter coatings focuses on a quartz substrates and four different nanorod batches each having nanorods with different aspect ratios (identified in Table 1 above).

In accordance with the results from the SAXS evaluation (for example, as depicted in FIG. 5), orientational order of the majority of nanorods was confirmed. Again, with the substrate substantially perpendicular to the incident beam (wave vector, $K_I$), and the x-ray scatters (with a final wave vector, $K_F$) at an angle $\phi$. For example, the scattering vector, $Q=K_F-K_I$ has a magnitude $Q=(4\pi \sin(q/2)/\lambda)$, with wavelength, $\lambda=0.124$ nm, in some implementations. Peaks in intensity, I, reveal structure in intensity (I) vs. magnitude (Q) plots. Through analysis of the 2-D detector image, and through a combination of Igor Pro with NIKA plug-in and Microsoft Excel, an alignment factor or parameter, S, was computed for points along the diameter of multiple filter coating assemblies, in accordance with at least some embodiments. The alignment factor S is determined that provides a measure of an average and/or a majority of the nanorod orientation and/or alignment by:

$$S = \frac{-2\int_0^{\frac{\pi}{2}} I_{C,avg}(\theta) P_2(\cos(\theta))\sin(\theta)d\theta}{\int_0^{\frac{\pi}{2}} I_{C,avg}(\theta)\sin(\theta)d\theta}. \quad \text{EQ. (1)}$$

In the transmission geometry, $\theta$, is the rotation angle in the detector and substrate plane with $\theta=0$ along an axis (which as depicted in FIG. 5 and based on an orientation of the incident beam is a vertical axis). The $P_2(\cos(\theta))$ is the second Legendre polynomial, and in some instances can be defined by $P2(\cos(\theta))=(\frac{1}{2})*(3\cos 2(\theta)-1)$. The $I_{C,avg}$ is the pixel averaged intensity along the radial direction using NIKA software. Both the $I_{C,avg}$, and the $P2(\cos(\theta))$ uncover the mean orientational ordering. The short axis (i.e., width) of the nanorods may generally align with $\theta=90°$ and $270°$, such that the long axis (i.e., length) of the nanorods are generally vertical with positive alignment values (S>0), as illustrated in FIG. 5. Again, the alignment factor, S, can provide a relative measure of order in the present form.

One or more selected volumes of the CdSe nanorod and solvent solution (e.g., about 0.05 ml, in some implementations) are deposited on the substrate surface. Evaporation is allowed to occur such that nanorod solutes are deposited on the surface along the liquid contact line as the contact line travels and/or recedes across the surface. Again, in some embodiments, the evaporation is controlled, in part through the temperature at which evaporation occurs, a rate of a gaseous flow across and/or about the substrate, substrate wettability and/or contact angle (e.g., flat or low contact angle solutions typically evaporate more rapidly), and other such controlled conditions. For example, in some instances, one or more substrates 212 are placed on a level platform or plane in a fume hood or other similar apparatus. Volumes or samples of the solution (e.g., using a 1 ml pipette or syringe) may be deposited on the one or more substrates (patterned or unpatterned substrates). The airflow relative to the one or more substrates can be controlled (e.g., the fume hood sash height linked to hood face velocities between 80 and 110 fpm are used). Further, in some instances, annealing and/or the application of additional solvent and/or solution may be applied while drying and/or after drying. The application of the additional solvent and/or solution may, in some instances, improve alignment of nanorods. It is noted that in some embodiments, the formation of the filter coating may be further controlled and/or the shape controlled through direction of evaporation, the tilting of the substrate, the migration of deposited solution, preferential evaporation, an amount of solution deposited, and/or other such methods. Further, the wetting contact angle can affect and/or dictate a surface area covered by the formed filter coating assemblies, and as such, relevant substrates and/or layers applied to substrates may be selected based in part on the wetting contact angle.

Once drying of at least the solvent is complete, the one or more nanorod filter coatings are evaluated using an SAXS. For example, one or more of the SAXS evaluations can include line scans performed with point scan collection times of about 120 seconds at points separated a selected distance (e.g., 0.25 mm, 0.5 mm, or other such separation), which may be implemented over twice a diameter (2d) of each nanorod filter coating assembly in mm providing that the diameter (e.g., about 2-5 mm sized) is fully sampled.

A correlation is identified between SAXS evaluation and the Langmuir adsorption by examining the x-ray scattering intensity dependence on volume fraction. Further, in some embodiments, an adsorption covering ratio is considered in approximating and/or matching an amount of nanorods deposited along a filter coating diameter as the fluid contact line recedes. The SAXS evaluation and Langmuir adsorption are connected by the small angle x-ray scattering dependence on volume fraction for N-particle assemblies with either spherical or rod shape. For nanorods in nematic or aligned configurations with similar or identical interparticle interactions, the scattering intensity can be defined by the below Equations 2 and 3, with the scattering intensity describing a relationship between number density or concentration, (N/V), structure factor, S(Q), the nanorod volume, $V_{rod}$, and the form factor, P(Q), as follows:

$$I(Q) = \left(\frac{N}{V}\right) * S(Q) * (V_{rod})^2 * P(Q), \qquad \text{EQ. (2)}$$

$$= \phi * S(Q) * V_{rod} * P(Q). \qquad \text{EQ. (3)}$$

$\phi$ is the volume fraction that equals the number of nanorods, N, multiplied by the volume per nanorod, $V_{rod}$, and divided by the total scattering volume, $V=V_{scat}$. The volume fraction, in some implementations, can be defined by:

$$\phi = \left(\frac{NV_{rod}}{V}\right) = \left(\frac{V_{rods}}{V}\right) \qquad \text{EQ. (4)}$$

where, $V_{rods}$ is the total volume of nanorods in a volume, V. Based on the nanorod shape, the form factor, P(Q), does not change substantially within a batch of nanorods, and in the high Q region (closest to nanorod width), the structure factor is negligibly the same within each dry assembly. Thus, for each batch, the peak scattering intensity, $I_{peak}$, is generally proportional to the volume fraction, i.e., $I_{peak} \sim \phi$.

The volume per nanorod, $V_{rod} = \pi L D^2/4$, can in some implementations be determined by the length, L, and width or diameter, D, of a nanorod (or average length and average diameter of multiple nanorods of a batch), which may be measured, for example, by a TEM. The scattering volume, $V_{scat}$, can be equated to the x-ray beam size or area ($A_{SAXS}$) multiplied by a filter coating assembly's average height, $z(nm)=z_{profile}$, which may in some instances be determined by profiling, $V_{scat}=(A_{SAXS} * z_{profile})$. For SAXS, the total volume, V, equals the scattering volume $V_{scat}$, which in some instances is approximately equal to a model deposit volume. The bulk solution volume fraction is also proportional to the concentration, $C_{sol}$, which can be defined in some instances by: $\phi_{sol}=(C_{sol}*V_{rod})$.

During evaporation, a volume decrease is observed as nanorods precipitate at the receding substrate-solution-vapor contact line. Physically, in Langmuir adsorption, increases in equilibrium pressure or concentration can result in increased surface coverage to unity or to a saturation limit. Similarly, evaporation that increases concentration or bulk volume fraction increases the number of nanorods deposited at the receding periphery of the deposited solution until drying is complete. Therefore, a Langmuir covering ratio, $\Theta$, can be linked to SAXS using the volume fraction in accordance with:

$$\Theta = \frac{N_{dep}}{N_{max}} = \frac{k_r C_{sol}}{(1+k_r C_{sol})} = \frac{k_r \phi_{sol}/V_{rod}}{(1+k_r \phi_{sol}/V_{rod})} = \frac{\phi_{dep}}{\phi_{max}}. \qquad \text{EQ. (5)}$$

The Langmuir covering ratio, $\Theta$, expresses the surface coverage for a set solution concentration, $C_{sol}$, with a reaction constant, $k_r$. Further, in some instances, the Langmuir covering ratio describes the nanorods deposited, $N_{dep}$, relative to a maximum, $N_{max}$, deposited in the final drying step. This ratio is also equal to the relative volume fraction, i.e., $\phi_{dep}/\phi_{max}$, or equivalently, the ratio of volume fractions that reference the same model deposit volume. The determined reaction constant, $k_r \sim \exp(E/(k_B T))$ enables energy estimates based on nanorod filter coating assembly, and the experimental connection between Langmuir adsorption and SAXS of N-particle assemblies is proven for at least some embodiments.

Figure 6:
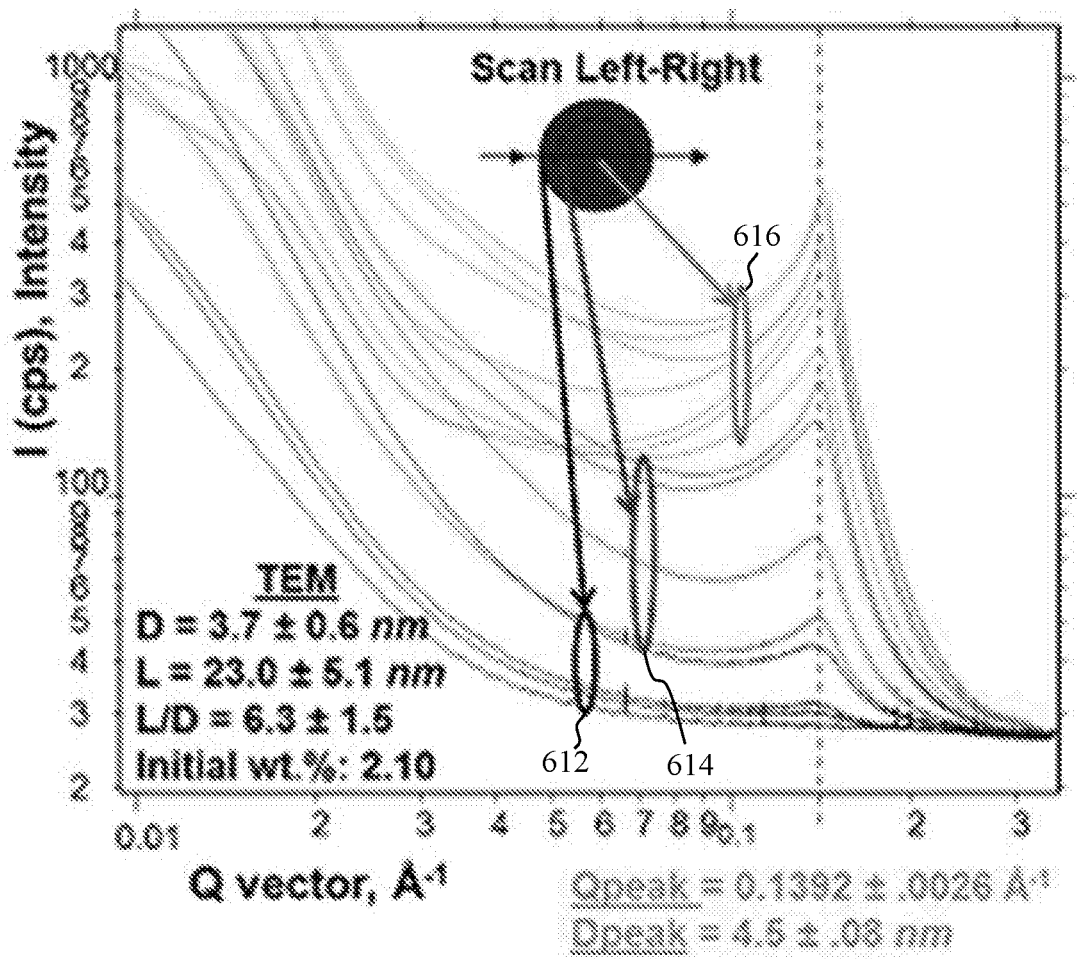
FIG. 6 shows a graphical representation of exemplary scattering intensity relative to the scattering vector of SAXS scans of a nanorod filter coating, in accordance with some embodiments.
Figure 7:
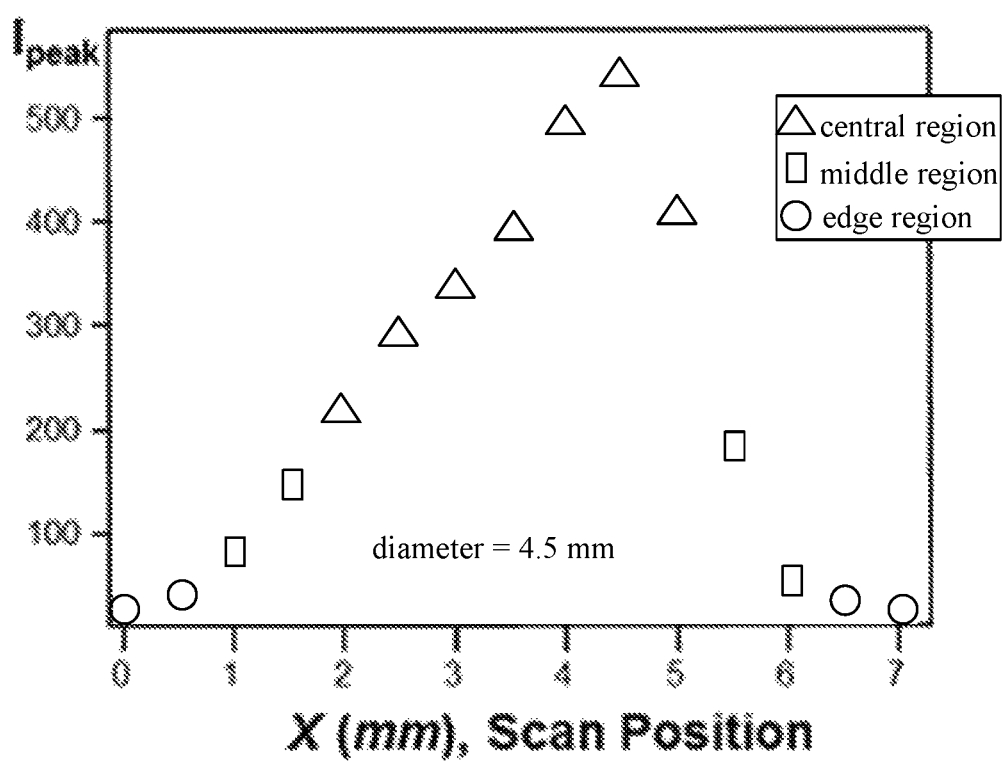
FIG. 7 shows a graphical representation of exemplary scattering intensity peaks (for the same aspect ratio batch) versus position along the filter coating, in accordance with some embodiments.

FIG. 6 shows a graphical representation of exemplary scattering intensity, I, relative to the scattering vector, Q, of SAXS scans of a nanorod filter coating (e.g., nanorods with an average aspect ratio of about L/D=6.3±1.5 for diameter scans in 0.5 mm increments), in accordance with some embodiments. FIG. 7 shows a graphical representation of exemplary scattering intensity peaks (for the same aspect ratio batch), $I_{Qpeak}$, versus position, X(mm), in accordance with some embodiments. As depicted in FIGS. 6 and 7, scattering caused by a region near an edge (indicated by circle 612 in FIG. 6 and triangles in FIG. 7) of the filter coating assembly, a middle region (indicated by circle 614 in FIG. 6 and rectangles in FIG. 7), and a central region (indicated by circle 616 in FIG. 6 and by circles in FIG. 7). In accordance with the example depicted in FIGS. 6 and 7, the scattering increases toward the center of each filter coating assembly at a scattering vector $Q_{peak}$, or with characteristic spacing, $D_{peak}$. In some implementations, the scattering increases toward the center of each assembly at a scattering vector $Q_{peak}$, or with characteristic spacing, $D_{peak}$, in Table 2 that closely matches the nanorod (plus ligand) size by TEM in Table 1. Table 2 below illustrates, for batches of nanorods having different average aspect ratios (which are similar to those identified in Table 1 above), mean peak scattering vectors, $Q_{peak}$, inter-particle spacing, $D_{peak}$, and film or coating average height or thickness, $Z_{profile}$, for each nanorod batch.

TABLE 2

Qpeak, Dpeak, zprofile - SAXS and profilometry (on quartz substrate)

| L/D | $Q_{peak}$ (Å$^{-1}$) | $D_{peak}$ (nm) | $z_{profile}$ (nm) |
|---|---|---|---|
| 3.6 | 0.107 ± 0.003 | 5.85 ± 0.17 | 20978.4 |
| 6.3 | 0.137 ± 0.001 | 4.57 ± 0.04 | 11310.9 |
| 11.7 | 0.118 ± 0.003 | 5.33 ± 0.15 | 14389.0 |
| 12.4 | 0.122 ± 0.003 | 5.14 ± 0.12 | 9664.8 |

The increasing trend in peak intensity, $I_{peak}$, as identified in part through application of Equation 5 (and the below Equations 6, 7, and 8) substantiates the identified Langmuir adsorption-SAXS connection.

As established by Equation 6, below, the relative peak scattering intensity, ($I_{peak}/I_{max-peak}$) enables the Langmuir covering ratio, $\Theta$, in Equation 5 to be rewritten to include a bulk solution volume, $V_{sol}$. Equation 7 shows that a fit constant, a, is proportional to the reaction constant, $k_r$. A spherical cap can be used to model the solution volume as $V_{sol}=V_{s\text{-}cap}(r,\theta)=f(\theta)r^3$, with $\theta$ equal to the solvent contact angle (e.g., methylcyclohexane) estimated by a water contact angle, $\theta=90°-\theta_{H2O}$.

$$\frac{\phi_{dep}}{\phi_{max}} \cong \frac{(I_{peak})}{(I_{max\text{-}peak})} = \frac{(a/V_{sol})}{(1+a/V_{sol})}, \quad \text{EQ. (6)}$$

$$k_r = \left(\frac{\pi L D^2}{4}\right)\left(\frac{a}{V_{sol} * \phi_{sol}}\right). \quad \text{EQ. (7)}$$

It is predicted that the nanorods precipitate with comparable solubility limits. During evaporation, the fluid contact line recedes and a percentage distance along a width or diameter based on profilometry, which provides a computerized, high-sensitivity surface profile that measures roughness, waviness, and/or step height over a surface (e.g., obtained from an Alpha-Step IQ (ASIA) profilometer from KLA-Tencor Corp.), is used to unite nanorod drying behavior for different aspect ratios. Each dry deposit position matches a distance value, $d_{scale}$ (mm), used to calculate a size or radius of the volume of the solution deposited onto the substrate surface (sometimes referred to as a drop radius), $r=r_{sol}$, where in some instances $d_{scale}=0$ at an outer edge of each filter coating assembly. A parameter $d_{max\text{-}peak}$ is defined as a distance from the edge of the filter coating assembly to a $d_{scale}$ position value of a maximum peak scattering intensity, $I_{max\text{-}peak}$. A radius, $r_{scat}$, can be defined for matching a minimum spherical cap volume, $V_{s\text{-}cap}$, to a scattering volume, $V_{scat}$. In some implementations, for the solution radius, $r_{sol}$, a value of $2*r_{scat}$ can be added to the difference $(d_{max\text{-}peak}-d_{scale})$ to ensure an effective nonzero reference bulk solution drop or deposit volume, $V_{sol}=8*V_{scat}$ at $d_{scale}=d_{max\text{-}peak}$ with $r_{scat}=(V_{scat}/f(\theta))^{1/3}$.

In some embodiments, a Langmuir related data analysis can include a plot of peak intensity $I_{peak}$ versus an inverse of the solution drop volume $(1/V_{sol})$. Equation 8 provides a ratio of the peak intensity to solution drop volume $(I_{peak}/V_{sol})$:

$$\frac{(1/V_{sol})}{(I_{peak})} = \frac{(1/V_{sol})}{(I_{max\text{-}peak})} + \left(\frac{1}{(I_{max\text{-}peak})*a}\right). \quad \text{EQ. (8)}$$

Figure 8A:
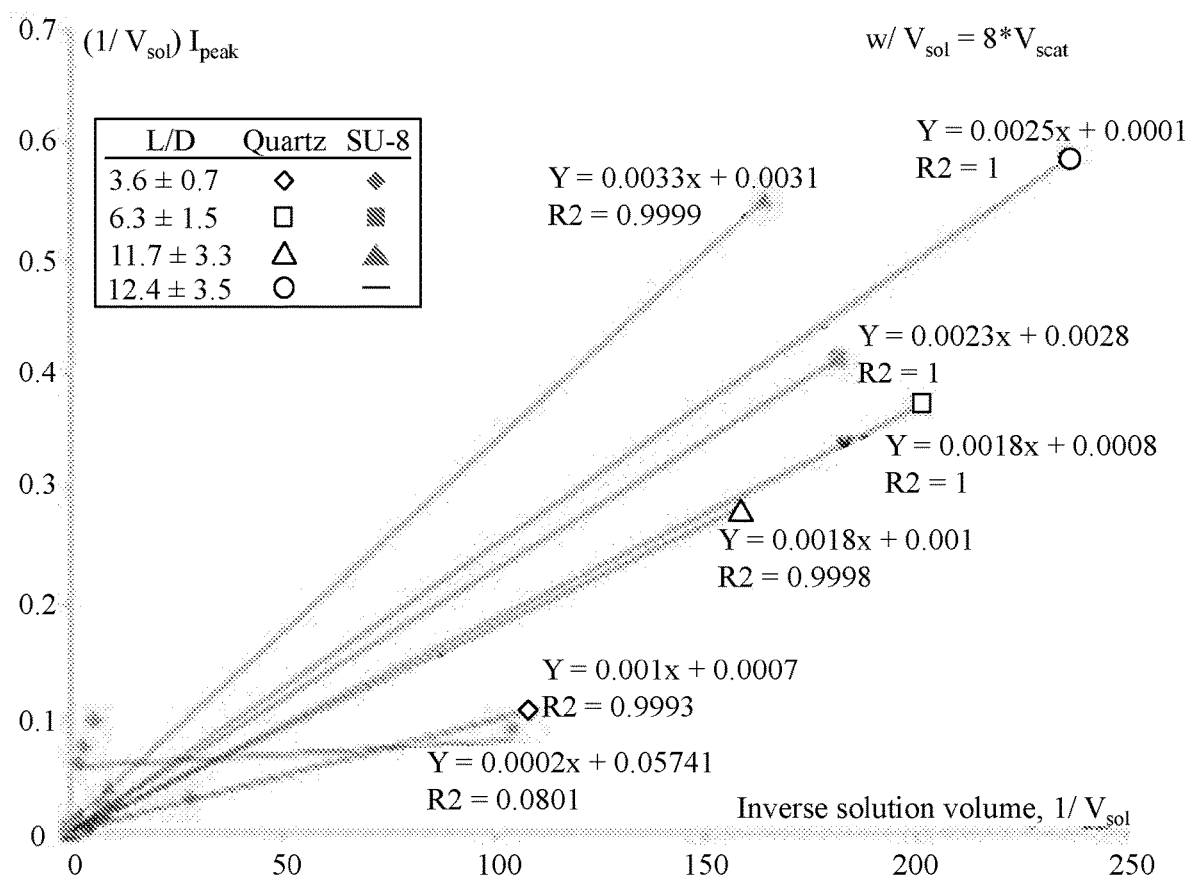
FIG. 8A shows a graphical representation, with respect to some embodiments, of Langmuir reciprocal plots for full model fitting of the fit constant and maximum peak intensity, and illustrating a fit using a nonzero reference bulk solution volume.
Figure 8B:
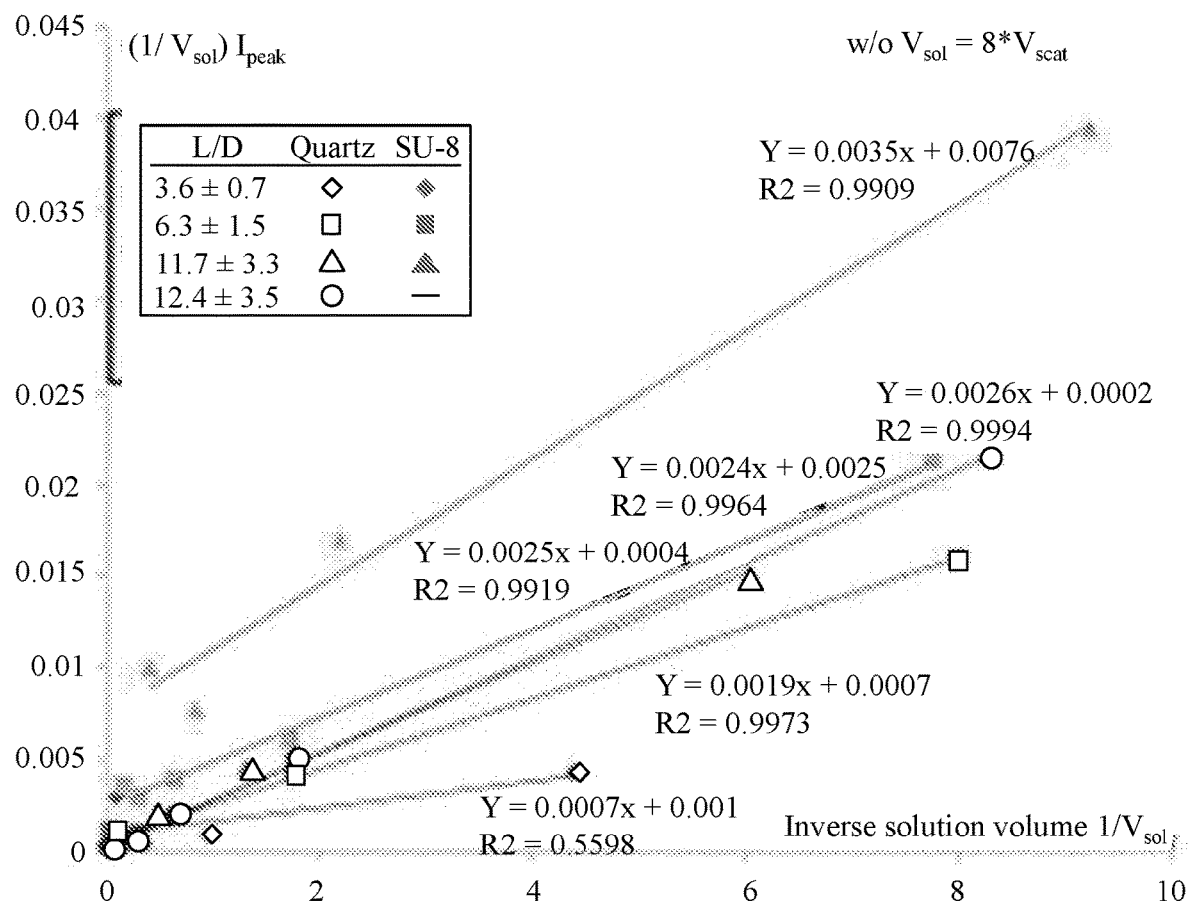
FIG. 8B shows a graphical representation, with respect to some embodiments, of Langmuir reciprocal plots of a modified fit without reference bulk solution volume.

FIG. 8A shows a graphical representation, with respect to some embodiments, of Langmuir reciprocal plots in accordance with Equation 8 for full model fitting of the fit constant, a, and maximum peak intensity, $I_{max\text{-}peak}$, and illustrating a fit using a nonzero reference bulk solution volume, in this example $V_{sol}=8V_{scat}$ (where the factor of 8 corresponds, in this implementation, to assigning a drop radius equal to 2 times the radius of the scattering volume). It is noted that this representation shows one bad fit for nanorods with a lowest aspect ratio (L/D) of about 3.6 deposited on an SU-8 layer. FIG. 8B shows a graphical representation, with respect to some embodiments, of a Langmuir reciprocal plots of a modified fit without reference bulk solution volume (where a plot relative to nanorods with smallest aspect ratio on an SU-8 layer were not shown due to a negative slope fit). FIG. 8A illustrates a full model, while FIG. 8B is an example application of the model where the max intensity point is removed (the small volume may distort accurate data interpretation and the removal the maximum intensity point allows more of the data to be observed for data values closer to the origin).

Some embodiments preform a Langmuir related data analysis beginning with the $I_{peak}$ versus $(1/V_{sol})$ plots. For example, using a reciprocal fit, in accordance with Equation 8, and in view of FIGS. 8A and 8B, the maximum intensity, $I_{max\text{-}peak}$, can be checked, and the fit constant, a, can be determined. As illustrated in FIG. 8A, the full model fits (with $V_{sol}=8V_{scat}$) show relatively accurate fits of linear behavior (e.g., a coefficient of determination, $R^2$, for linear regression of the model fits generally provide $R^2>0.98$), again except for the smallest aspect ratio nanorods in these example of about 3.6 on a SU-8 substrate. The modified fits, illustrated in FIG. 8B, without $V_{sol}=8V_{scat}$, similarly show relatively accurate fits ($R^2>0.98$) linear behavior, except for the smallest aspect ratio nanorods in these evaluations of about 3.6 deposited on a quartz substrate (where the poor fit for the lowest aspect ratio on an SU-8 substrate is removed). Other than the SAXS measurement, there is no strongly apparent difference (including optical birefringence) in the filter coatings formed on the quartz substrate and the SU-8 substrate for nanorods having an aspect ratio (L/D) of about 3.6±0.7. In some instances, it may be presupposed an increase in translational entropy may result on an SU-8 substrate due to better wetting by methylcyclohexane.

Further, in some embodiments, the batches of solution containing the desired amount of nanorods within the volume of solvent are produced to be sufficiently dilute that an ordered phase is typically not observed. During evaporation the volume fraction typically is seen to progress toward isotropic-nematic (I-N) phase coexistence. By further considering and/or including the attractive dipole-dipole interactions of the nanorods (e.g., CdSe nanorods), nanorod alignment is predicted to occur. This alignment is further confirmed, in part, by an alignment factor S (from EQ. 1) or intensity weighted order parameter versus a relative position, X % (mm), along a filter coating assembly.

Figure 9:
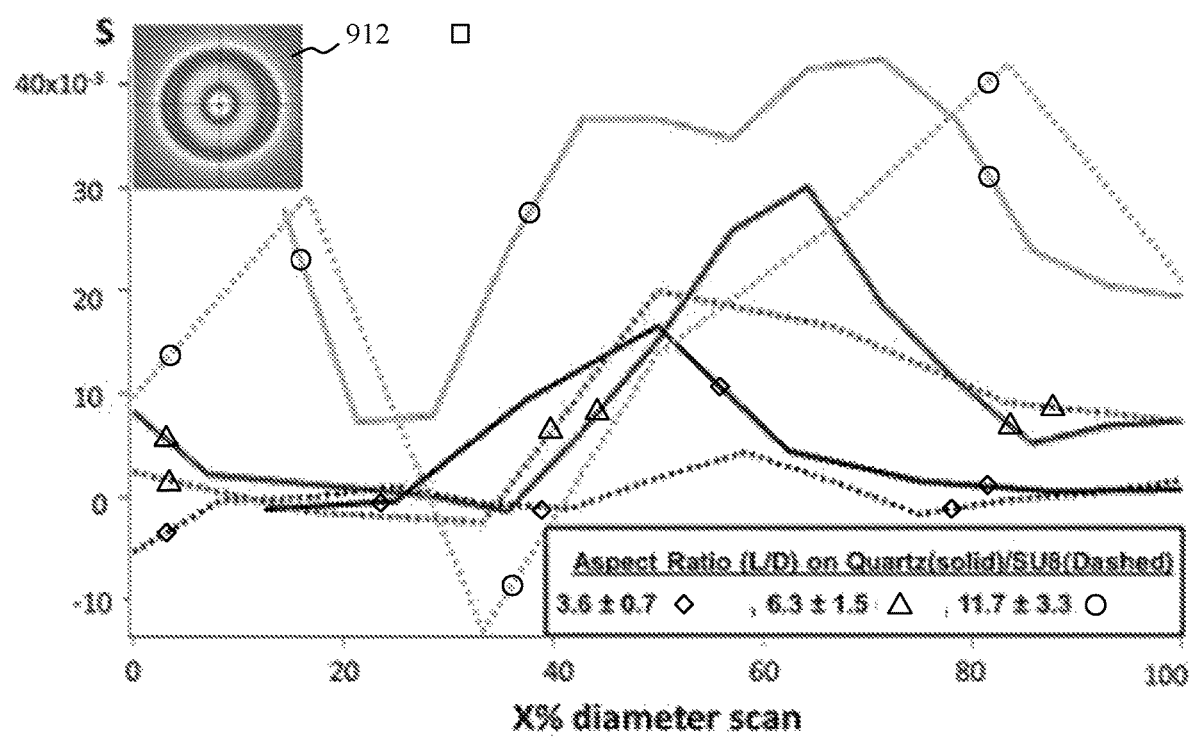
FIG. 9 shows a graphical representation of alignment factor versus a relative position along an axis or diameter of filter coating assemblies formed from multiple batches of solutions having nanorods with differing average aspect ratios, in accordance with some embodiments.

FIG. 9 shows a graphical representation of alignment factor S (from EQ. 1) or intensity weighted order parameter versus a relative position, X % (mm), along an axis or diameter of filter coating assemblies formed from multiple batches of solutions having nanorods with differing average aspect ratios, in accordance with some embodiments. In this representation, three solution batches are considered with nanorods having aspect ratios consistent with the three lowest aspect ratios (L/D) identified in Table 1 above (i.e., aspect ratios of 3.6±0.7; 6.3±1.5; and 11.7±3.3), and deposited on a quartz substrate (represented by the solid curves in FIG. 9) and an SU-8 substrate or layer (represented by the dashed curves in FIG. 9). FIG. 9 further includes an inset of a two-dimensional detector image 912. As illustrated in FIG. 9, there is generally a progressive increase in alignment with increasing nanorod concentration, $C_{sol}$, within the solution as the deposited volume of solution evaporates. Similarly, the two-dimensional detector image 912 and the alignment greater than zero (S>0) show that nanorods align generally perpendicular to the diameter in some implementations. It is further noted that in some implementations solutions with nanorods having higher average aspect ratios (e.g., L/D=11.7±3.3) may align earlier at the edges of the nanorod filter coating assemblies. Additionally, in the evaluation of the nanorod alignments, the solution with the nanorods having the lowest aspect ratio (i.e., in the example corresponding to FIG. 9 and the nanorods with aspect ratio L/D=3.6±0.7) that was deposited on an SU-8 substrate did not exhibit significant orientational order.

With the Langmuir fits, the reaction constant, $k_r$, can be established, and for the peak intensities the volume fraction, $\phi_{sol}$, can be calculated (see Equation 7). Some embodiments estimate and/or confirm the isotropic-nematic (I-N) phase coexistence and/or the onset of nanorod alignment due to evaporation by, at least in part, comparing different solutions having nanorods with different aspect ratios using the correspondence between the volume fraction, $\phi_{sol}$, and the relative position or occurrence of a nanorod deposit along an axis or diameter of the solution deposit. Additionally or alternatively, in some embodiments, the Langmuir modeling is further evaluated by plotting the covering ratio, $\Theta$, versus a relative position, $X_{min-max}\%$, across the filter coating assembly, corresponding to the edge-to-center peak intensities (e.g., see FIGS. 6 and 7, for nanorods having an aspect ratio L/D=6.3±1.5).

Figure 10:
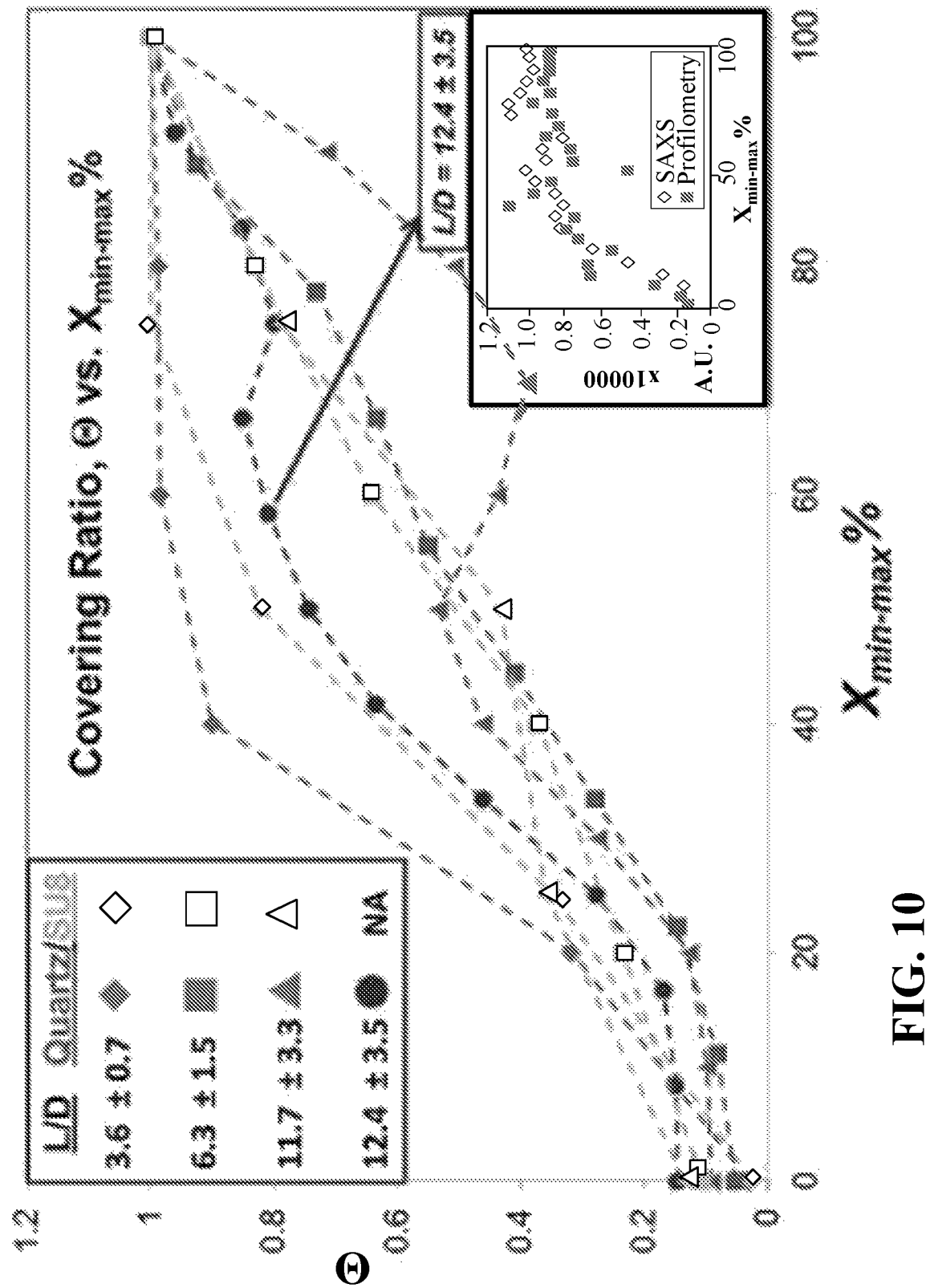
FIG. 10 shows graphical representations, in accordance with some embodiments, of plots of the Langmuir covering ratio versus relative position along diameter from edge (low intensity) to central (maximum intensity) portion on the filter coating assembly for multiple solution batches having nanorods with different aspect ratios.

FIG. 10 shows graphical representations, in accordance with some embodiments, of plots of the Langmuir covering ratio, $\Theta$, versus the relative position, $X_{min-max}\%$, on the filter coating assembly, corresponding to edge-to-center peak intensities (as shown for nanorods with L/D=6.3±1.5 in FIGS. 6 and 7), for multiple solution batches having nanorods with different aspect ratios (i.e., those identified in Table 1) as applied to both a quartz substrate and an SU-8 layer. FIG. 10 further includes an inset, in the lower right, graphically illustrating a best profilometry-SAXS correspondence plot observed (by eye using an arbitrary constant of proportionality), which occurs, in some implementations utilizing CdSe nanorods, having an aspect ratio L/D=12.4±3.5 and deposited on a quartz substrate. This illustrates a visual impression of Langmuir isotherm saturation behavior, where the thin film height scales with the amount of nanorods deposited. Using profilometry, based on measurements from a profilometer to measure surface profile and/or roughness, the height (nm) vs. diameter (um) can be obtained of each assembly with 0.4 um in width and nm thickness resolution, and the profilometry data can be averaged over 0.5 mm intervals to correspond with the measured SAXS data. Based on the fitting procedure, batches are compared using the same relative position scaling in FIG. 6, and match the Langmuir isotherm determined volume fractions to the relative positions of the edge-to-center peak scattering intensities, $\Theta$ verse $X_{min-max}\%$. A series of exponential curve fitted volume fraction (i.e. $\phi=\phi_{sol-fit}$) equations are established for each aspect ratio.

At relative positions from 0% to 100% in 5% intervals, we compare volume fractions using the log equation form for Onsager's estimate of I-N phase coexistence, $$\log \phi = -m \log(L/D) + b,$$

where m=1 and b=log 4. In many instances, exp(b)=c* is the bifurcation point between isotropic phase (orientations are present or disorder) and nematic phase (assemblies with orientational order with little to no positional order); however, this is not fully defined with respect to attractive interactions present. The best-fit on a quartz substrate, in accordance with FIG. 10, occurs at a position $X_{min-max}\%=35\%$ where slope and intercept match m=1.4233 and b=−0.7188 respectively ($R^2$=0.8223). For SU-8 layer or substrate, at the same position, the slope and intercepts are m=1.1564 and b=0.0845 ($R^2$=0.8328). However, at position, $X_{min-max}\%=30\%$, both SU-8 and quartz substrates exhibit substantially similar slopes, $m_{quartz}$=1.2462, and $m_{SUB}$=1.2239, with intercepts, $b_{quartz}$=−0.9872 and $b_{SUB}$=0.0016 (with $R^2$=0.8073; and $R^2$=0.8154). The slopes are near the expected value of m=1. The intercepts, however, are different, which is apparent and consistent with the present embodiments for a volume fraction $\phi=c^*/(L/D)$. Empirically, the log-log probe successfully estimates the inverse relationship between volume fraction and aspect ratio.

Again, referring to the data corresponding to FIG. 10, monotonic changes in the slope, m, are observed which is consistent with the preferential evaporation driven changes in volume fraction. In the below discussion, the positions $X_{min-max}\%=30\%$ or 35%, define the points of "I-N onset" or points at which nanorods align during evaporation. The determination of the I-N onset points tracks well with computed intensity weighted order parameter, S vs. X % in FIG. 9. By comparing the I-N onset point to the emergence of order in the diameter scan of the nanorod filter coating assembly, it is found that the point, $X_{min-max}\%=35\%$ translates to approximately X %=25% (from the left in FIG. 9) along the diameter, thus showing good agreement with the progressive increase of the order parameter values, S, in FIG. 9. A non-correlated determination of the bifurcation, c*, illustrates a lack of full consideration of the I-N phase coexistence in the ideal Onsager context for dilute solutions. Alternatively, it is concluded that during evaporation volume changes drive the system toward characteristic I-N behavior whereupon nanorods interact strongly enough to influence the emergence of alignment in the resulting nanorod deposits.

Effectively, nanorods and solvent molecules transition from liquid to condensed phase and vapor respectively. It is observed that this process may, in some implementations, be reversible because nanorod solutions can be recovered by solvent addition, which may also lead to solvent annealing effects in microchannels (as further discussed below). When the nanorod solutions wet surfaces, Van der Waals forces resulting from surface, particle, and dispersion influences may determine and/or affect particle assembly. In the context of the SAXS-constructed Langmuir model in accordance with some embodiments, nanorod-nanorod interactions can be significant when a non-negligible nanorod occupation of the model deposit volume occurs. A mean-field perspective may be adopted where instead of the traditional Langmuir model of a nanorod being attracted by a surface with energy cost, $E_{surface}>0$, it is recognized that the attraction by other nanorods within the solution with energy, $E_{rod-rod}<0$ prior to precipitation. It is noted that the traditional Langmuir surface energy of an adsorbed atom typically equals−$E_{surface}$; ace; therefore, the nanorod-nanorod interaction in solution often mimics a seemingly unphysical repulsive force applied by the Langmuir adsorbing surface on a nanorod. By application of the Keesom interaction between dipoles, the energy associated with nanorod deposition is considered as a description of dominant nanorod-nanorod vs. actual surface interactions while the nanorods still remain in solution ($E=E_{surface}+E_{rod-rod}\approx E_{rod-rod}$). The subsequent precipitation likely arises due to solubility limits reached at diminishing volumes near the receding contact line. Alternatively, when evaporation is steady enough as observed, equal volumes may evaporate at the same relative rate with increasing nanorod concentration. In Equation 9, the mean-field energy, $E_{rod-rod}$, is set equal to the thermally averaged Keesom interaction energy between nanorods with dipole moments, $u_i$ for i=1, 2. The interparticle separation, $r_k$ is highlighted with respect to the permittivity of free space, $\varepsilon_o$, the boltzmann constant, $k_B$, and the absolute temperature, T.

$$\frac{E_{rod-rod}}{k_B T} = \frac{-u_1^2 u_2^2}{(4\pi\varepsilon_o)^2 (k_B T)^2} \frac{2}{3} \frac{1}{r_k^6}. \qquad \text{EQ. (9)}$$

Table 3 below shows, relative to nanorod batches with different aspect ratios consistent with those of Table 1, above, the corresponding Langmuir fit constant, a, and reaction constant, $k_r$, calculated relative to energy cost, $E/k_BT$, and interparticle separation, $r_k$, (on a quartz substrate). In Table 3, the reaction constants is used to match the energy, $E=E_{rod-rod}$, equal to the Keesom energy. Then, by applying:

$$u_{z\_nanorod}=0.19 \text{ uC}/(\text{cm}^2)*V_{rod},$$

and/or the nanorod dipole moment scales with nanorod volume, the interparticle or nanorod-nanorod separation, $r_k$, can be calculated (as listed in Table 3).

TABLE 3

Langmuir fit and reaction constants, calculated relative energy cost, $E/k_BT$, and Keesom determined interparticle separation, $r_k$ (on quartz).

| L/D | α | $k_r$ | $E/k_BT$ | $r_k$ (nm) |
|---|---|---|---|---|
| 3.6 | 1.4 | 3.83e-15 | -14.4173 | 3.6 |
| 6.3 | 2.3 | 3.95e-15 | -14.4037 | 5.0 |
| 11.7 | 1.8 | 1.78e-14 | -13.7491 | 8.7 |
| 12.4 | 8.3 | 1.01e-14 | -13.9945 | 8.0 |

The particle-separation is found to be on the order of nanometers (nm) and generally not equal to the SAXS determined $D_{peak}$ values (in Table 2) which may distinguish the surface vs. solution impact on assembly.

Figure 11:
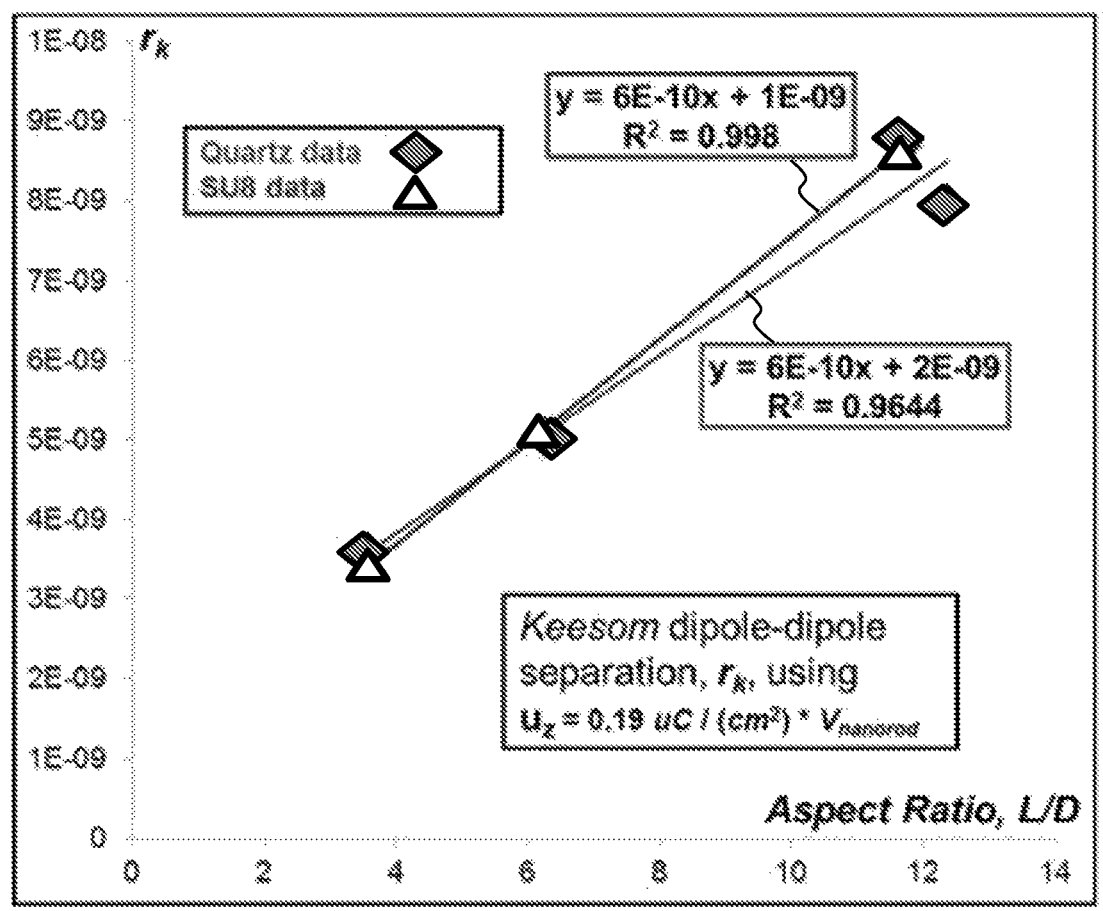
FIG. 11 graphically illustrates, in accordance with some embodiments, the relationship between Keesom inter-nanorod dipole-dipole separation vs. aspect ratio for different batches of nanorods having different aspect ratios.

FIG. 11 graphically illustrates, in accordance with some embodiments, the relationship between Keesom inter-nanorod dipole-dipole separation, $r_k$, vs. aspect ratio, L/D, for different batches of nanorods having different aspect ratios deposited on both quartz and SU-8 substrate and/or layer. As illustrated in FIG. 11, nanorod behavior on quartz and SU-8 substrates show dependence on aspect ratio (excluded volume).

By plotting the separation, $r_k$, vs. aspect ratio, L/D, excellent linear fits, a, highlight a strong dependence on nanorod shape and size through aspect ratio. Underlying this result is the consideration that the nanorods concentrate enough to approach excluded volume limits where the dipole-dipole or nanorod-nanorod interaction is strongest. It is noted that if the higher aspect ratio batch, L/D=12.4±3.5, is removed the result on quartz and SU-8 becomes substantially identical by fit. Using the mean-field estimate, we conclude that there is little difference in substrate influence exerted by quartz and SU-8 substrates. This agrees with the observation of similarly compact CdSe nanorod assemblies forming on aluminum foil, stainless steel, and borosilicate substrates. Robustly, this observation also extends to solutions prepared for TEM with estimated dilution as low as $3.2 \times 10^{-4}$ wt. %. It is further noted that Onsager's isotropic-nematic (I-N) phase coexistence prediction does not include attractive or Van der Waals interactions. As such, with sufficiently dilute solutions the attractive interactions may be neglected in some implementations. Accordingly, some embodiments provide a dual identity phase behavior. In the bulk, Onsager's estimates may apply with some embodiments; however, in the smaller model volume near the contact line a transition from the bulk to the condensed nanorod phase occurs where attractive interactions are significant and Onsager's estimate typically does not apply. Through the open contact between the bulk and model volumes, both Onsager's I-N phase coexistence and the aligning role of attractive influences are conjoined in accordance with some evaporation implementations. The amount of alignment achieved may vary depending on many factors such as but not limited to the type of nanorod used, the aspect ratio or ratios of nanorods used, the amount of nanorod deposited, the height or thickness of the filter coating, and/or other such factors.

In some approaches, Langmuir adsorption and SAXS evaluation are combined to estimate the onset of nanorod alignment, which in some instances may be instigated by the dipolar character of the nanorods (e.g., CdSe nanorods). The use of the SAXS confirms and demonstrates that peak scattering intensity, for some applications of a filter coating 218, increases toward a central area or axis (e.g., along a diameter toward the center) of each dry filter coating assembly. Again, using the information and/or agreement of SAXS and profilometry results, can tune the filtering and/or absorption effects of the filter coating based at least in part on the Lyotropic feature of emergent orientational order and/or alignment in nanorod solutions. With a mean field approach involving the rod-rod or dipole-dipole interaction, where the nanorod dipole moment can scale with nanorod volume, some embodiments utilize reaction constants that result in nanometer scale interparticle separations that increase with aspect ratio or excluded volume. Further, in some embodiments, a computed SAXS weighted intensity alignment factor, which improves with aspect ratio, is calculated and utilized to clarify increasing edge-to-center orientational ordering within dry nanorod assemblies. In some embodiments, the onset of nanorod alignment instigated by the dipolar character of the nanorods (e.g., CdSe nanorods) is estimated.

Some embodiments use tuning of the refraction index based on nanorod type and/or interaction specific tailoring that includes surface ligands. The deposition and organization of nanorods can be controlled not just by optimum evaporation conditions, but also by the intrinsic or predominate features of the solute. By using SAXS on dry filter coating assemblies, the Langmuir adsorption isotherm can be applied to estimate I-N onset or the emerging nanorod alignment, based on the nanorod's dipolar character. Further, by using SAXS and evaporation Lyotropic aspects of changing phase or alignment behavior can be estimated and/or predicted using an absorption model. Diminishing bulk volume change can increase the CdSe nanorod solution concentration enough for dipole-dipole influences to set in. As such, the Keesom interaction underlies a mean field picture which describes nanorod interactions that are strongest at the solution edge as expected since evaporation can occur first at the edge or at the surface layer of the solution volume. Broadly, this mean field approach can be applicable to other nanoparticle-solutions or systems where interparticle interactions have been especially chosen. The nanorod organization and control on nanoscale dimensions is consistent with continuing efforts in nanoparticle assembly.

EXAMPLE 2

Some embodiments establish nanorod alignment and/or likely flows in microchannels formed on and/or within substrates. A solution is prepared by combining a nanorod batch with a volume of solvent to form a solution. Some embodiments implement and/or control evaporation where competing solvent and nanoparticle phase transitions combine in a non-equilibrium system to effect changes on relatively large length scales (e.g., millimeters (mm) at scales much larger than the size of the nanorods). In this example, CdSe nanorods are obtained. As indicated above, however, other types of nanorods may be used in other embodiments. In some instances, the CdSe nanorods are synthesized, for example, with a combination of TOPO, HPA, and TDPA ligands using $CdMe_2$ precursor in accordance with known established procedures or recipes (e.g., precursors can be prepared using high purity Argon, such as in a glove box or the like). In some embodiments, the CdSe nanorods utilized have diameters between 3.7 and 4 nm, with lengths ranging from 13 nm to 57 nm. Again, other sized nanorods may be used.

Table 4 shows TEM statistics for nanorod batches utilized in some embodiments in achieving aligned nanorods relative to microchannels. These batches of nanorods comprise nanorods having aspect ratios: L/D=12.4±3.5; L/D=13.1±3.4; L/D=15.6±6.1; and a smaller aspect ratio with L/D=3.6±0.7.

TABLE 4

TEM Statistics

| Aspect Ratio (L/D) | Width (D, nm) | Length (L, nm) |
|---|---|---|
| 3.6 ± 0.7 | 3.8 ± 0.7 | 13.2 ± 1.6 |
| 12.4 ± 3.5 | 3.7 ± 0.7 | 45.0 ± 11.6 |
| 13.1 ± 3.4 | 4.0 ± 0.7 | 51.0 ± 10.1 |
| 15.6 ± 6.1 | 4.0 ± 1.3 | 56.3 ± 9.4 |

In some embodiments, the nanorod batches are initially dispersed in an anhydrous hexane, and through co-solvent (hexane/2-propanol) cleaning. Sedimentation and centrifugation is performed using a target solvent, which in some embodiments comprises an organic solvent, such as but not limited to methylcyclohexane. Finally, desired quantities of nanorods are dispersed in the target solvent producing sample solutions. The concentration of the nanorods within the solvent can further affect the filter coating and/or evaporation. For example, in some embodiments, the amount of nanorods added to the solvent is less than 4% by weight, and in some implementations the batches of solution comprising the solvent and the nanorods are prepared with nanorods of less than 3 wt. %. TEM evaluation solutions were estimated on the order of 3.2×10-4 wt. % or less.

Referring back to FIGS. 3A-3B, a volume of the solution is applied onto the surface of the substrate 212 over the microchannels 320 and/or into one or more of the reservoirs 330-331. Some embodiments utilize quartz wafers (e.g., HOYA, 4 W 55, 52 um), which may be beneficial in measuring optical birefringence and/or SAXS on the deposited nanorods. Photolithography can be performed to establish SU-8 coated quartz wafers, providing hydrophobic (cured SU-8) surfaces. KRUSS contact angle instruments and ASIQ profilometry can be used to characterize both surface wetting by water and channel widths and depths. In some embodiments, the water contact angle on SU-8 was approximately 85°. The microchannels 320 formed in the substrate and/or the SU-8 layer can have varying dimensions. For example, in some embodiments, the microchannels have approximately a 1 mm length, with approximately a 20 μm depth. As one example, microchannels may be formed in SU-8/quartz with SU-8 floor (e.g., 5 μm on quartz) and wall (20 μm depth). The width, w, may vary and in some instances the set of microchannels on a single substrate may vary. For example, a set of ten microchannels may be formed with a first pair having a 20 μm width, a second pair having a 40 μm width, a third pair having a 60 μm width, a fourth pair having 80 μm width, and a fifth pair having a 100 μm width. Again, in some implementations, the microchannels extend from one or more reservoirs 330-331. Further, in some instances, the microchannel design is inspired by a capillarity-driven stop valve to geometrically trap fluid within the microchannels. By creating an abrupt change in the channel width with a transition into a larger reservoir 330-331, a pressure barrier forms at the microchannel ends that typically stops or limits flow.

Figure 12:
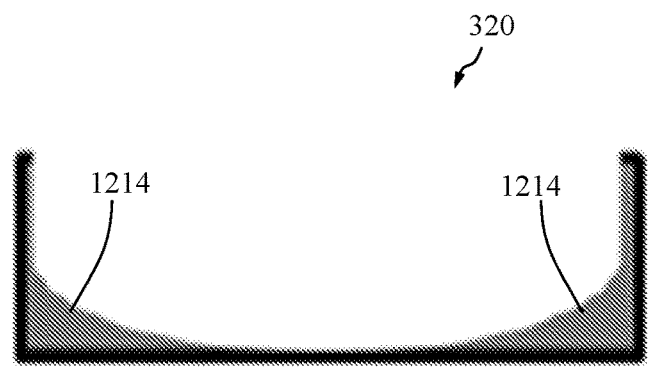
FIG. 12 shows a simplified cross-sectional view of a microchannel and further illustrates corner flow, in accordance with some embodiments.

Evaporation is allowed and controlled to achieve an alignment of nanorods within at least the one or more microchannels 320. Again, evaporation is implemented to increase the nanorod volume fraction toward a nematic phase to quickly align nanorods on device scales. During evaporation, the nanorods concentrate or reorganize with increasing volume fraction, as illustrated in FIG. 3A, and in some instances the solution color deepens. The solvent used can enhance the concentrating effect of evaporation and increase the chance of entering the Lyotropic nematic phase. Some embodiments utilize methylcyclohexane, however, other solvents may be used as described above and below. Typically, the solvent is non-volatile, and the solution of the solvent and nanorods can be drop-casted on a flat substrate with microchannels. The SU-8 coated microchannel surfaces can have a water contact angle of about 85° for good wetting by methylcyclohexane. It is noted that if the channel floors and/or walls exhibit different contact angles, the asymmetry may set an environment where in the final drying stages less corner flow may be observed. FIG. 12 shows a simplified cross-sectional view of a microchannel 320 and further illustrates corner flow 1214, in accordance with some embodiments.

As described above, some embodiments utilize relatively shallow microchannels (Depth/Width=0.2 to 0.25<1). In these shallow microchannels there is virtually no dead zone with respect to transverse capillary pressure and constancy of the radius of curvature. This means that in the limit of low methylcyclohexane or fluid contact angle approaching zero, corner flows likely result under pressure driven or shear flow. Fluid pinning is a developed example of contact angle asymmetry that may arise by cross-patterning hydrophobic with hydrophilic regions. For hydrophobic surfaces with hydrophilic nanoscale trenches closely scaled with nanocrystal size, the alignment or confinement of sub-50-nm nanocrystals (including tetrapod shapes) has been achieved with evaporation. In some embodiments, however, pinning is limited and/or substantially avoided by using the SU-8 layer for the microchannel surfaces. Further, some embodiments limit the nanorods to the collective behavior of sub-60 nm CdSe nanorods resulting from evaporation and capillary effects.

It is noted that the chances of flow aligning nematics are high under steady flow conditions. Thus, with planar wetting assumed, nanorods are less likely to flow perpendicular to pressure gradients along the microchannel length. Under nominally ambient conditions with an airflow (e.g., in a fume hood), advantageous flows may prove elusive and viscous effects become more significant. During evaporation, increases in solution viscosity often diminish the fluid velocity for axial flow, thus limiting tumbling or rotation.

Again, in some embodiments in determining nanorod alignment, digital image analysis and SAXS are applied. The SAXS confirms a degree of flow alignment that correlates with the channel length. In some implementations, the nanorods' flow aligns with the long-axis parallel to the channel walls for larger aspect ratios (L/D)>10. Further, with some embodiments, orthogonal flow alignment occurs for smaller aspect ratio (L/D)<4, with a short-axis of the nanorods parallel to the channel walls.

The nanorod infused solution is deposited on a level SU-8 patterned substrate. Some embodiments further control and/or induce evaporation by maintaining a flow of one or more gases (e.g., an airflow) over the surface of the substrate 212. For example, in implementations, an airflow over the surface is maintained between 80 and 100 feet per minute (fpm). A volume of solution (e.g., 0.1 ml) is applied on a multi-microchannel pattern (e.g., 4 mm×3 mm multi-microchannel template) with one or more reservoirs 330-331. During evaporation, the solution-substrate-vapor contact line recedes as nanorods set inside and often outside the microchannels forming filter coating assemblies, while achieving an alignment of a majority of the nanorods, which can provide a desired light filtering and/or absorption.

Again, the samples of deposited filter coating assemblies can be evaluated using SAXS. In some instances, the SAXS results show larger nanorod scattering and/or non-alignment within the microchannels. For example, nanorod evaluation and/or statistics can be obtained using Image Pro software on TEM micrographs established by a Tecnai G2 S-Twin electron microscope (200 kV). Polarized micrographs can be obtained with a NIKON E600 POL microscope. Digital image analysis using MATLAB can be used to estimate relative nematic director orientation based on pixel intensity information.

Some embodiments determine intensity, I, in accordance with Equation 10:

$$I = I_o (\sin(2\beta))^2 (\sin(\pi d \Delta n/\lambda_o))^2. \quad \text{EQ. (10)}$$

The intensity, under crossed polars, can determine an orientation angle, $\beta$, at a pixel location in the sample plane parallel to the polarizers.

As introduced above, the CdSe optical birefringence can be defined by $\Delta n = n_e - n_o = 0.0197$. The extraordinary index, $n_e$, is associated with dipoles along the CdSe nanorod's length, and the CdSe nanorod dipole moment typically scales linearly with nanocrystal volume. The sample, if represented by a single nanorod at each pixel location, produces the orientation angle, $\beta$, made with the polarization direction using crossed polars. The intensity, I and $I_o$, is determined from the greyscale converted image. $I_o$ matches the maximum intensity in a sample image under parallel or "uncrossed" polarizers. The wave-length equals, $\lambda_o = 532$ nm, and the sample layer thickness, $d = 13.502$ μm corresponding to $(I/I_o) = 1$, when $\beta = 0.785$ radians (45°).

With some exemplary filter coating assemblies formed on unpatterned substrates, profilometry measurements were performed (using an Alpha-Step IQ (ASIA) profilometer from KLA-Tencor Corp. at the Howard Nanoscale Fabrication Facility (HNF) of Howard University). An average sample thickness was determined equaling $z = 14.8346 \pm 4.0955$ μm (measured with nm resolution), which can be equated to approximately about 3700 nanorods having a width of about 4 nm (stacked parallel to the substrate). With digital estimates of a pixel feature density (e.g., 379 pixels/mm, or 2638 nm/pixel, which can be equated to about 660 nanorods/pixel), each $\beta$ matches on the order of $2,442,000 = 660*3700$ nanorods.

An assessment of nanorod orientation over select regions of interest (ROI) on a patterned substrate comprising the microchannels can include an assessment based on the digital image content. From histogram information (e.g., number of pixels with the same value of (3), the alignment factor or order parameter, S ($=S_{POL}$) can be determined in accordance with Equation 11 for each ROI:

$$S = \frac{-2\int_0^{\frac{\pi}{2}} f(\beta) P_2(\beta) \sin(\beta) d\beta}{\int_0^{\frac{\pi}{2}} f(\beta) \sin(\beta) d\beta}, \text{ where} \quad \text{EQ. (11)}$$

-continued $$f(\beta) = \frac{N(\beta) I(\beta)}{\sum_{\beta}^{ALL} N(\beta)}. \quad \text{EQ. (12)}$$

In Equation 11, the $P_2(\beta) = (\frac{1}{2})*(3 \cos^2(\beta) - 1)$, is the second Legendre polynomial for orientational measure. In Equation 12, the function, $f(\beta)$ establishes an intensity weighting based on the histogram information. The histograms provide the $N(\beta)$, the number of instances where an intensity, $I(\beta)$, occurs. Because at 45° between the polarizer (e.g., the photo's horizontal edge) and analyzer (e.g., the photo's vertical edge), maximal intensity can be obtained for a birefringent sample. There are two different 45° orientations in a microchannel (the two main diagonals), so that small angle x-ray scattering (SAXS) helps to clarify alignment relative to the channel walls.

Figure 13:
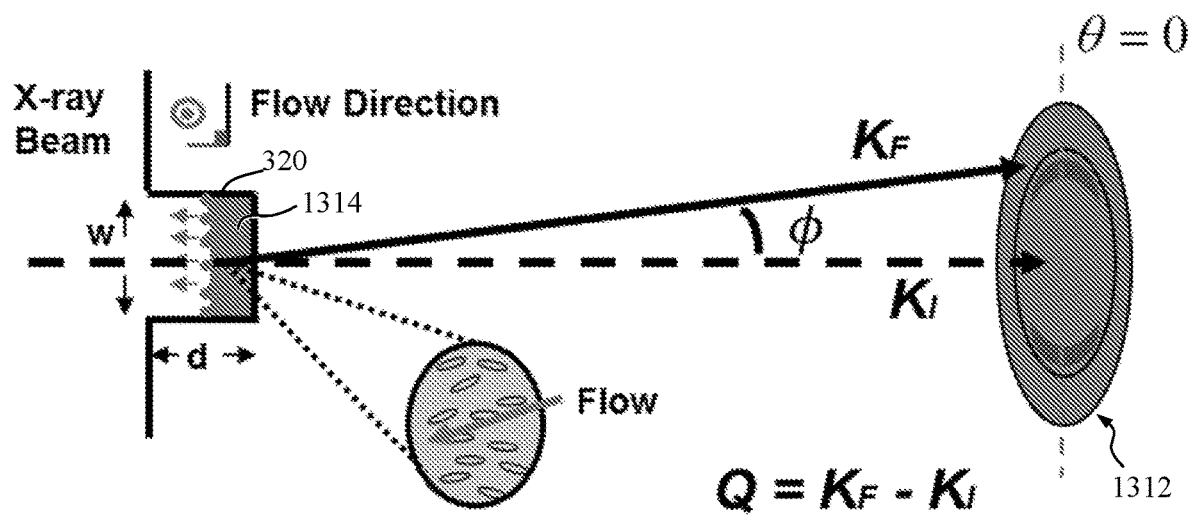
FIG. 13 illustrates a simplified cross-sectional view of a filter coating formed in a microchannel subject to an SAXS evaluation through a two-dimensional (2-D) detection of the scattering of an x-ray incident beam through the filter coating, in accordance with some embodiments.

Some embodiments confirm the orientational order using SAXS, for example, with a 100 μm×700 μm beam at the Advanced Light Source (ALS) beamline ALS BL 7.3.3. Further, in some embodiments, flat-edged quartz wafers and lead tape are used to enable coincident photolithographic patterning and locating of target samples. FIG. 13, similar to FIG. 5, illustrates a simplified cross-sectional view of a filter coating 1314 formed in a microchannel 320 subject to an SAXS evaluation through a two-dimensional (2-D) detection image 1312 of the scattering of an x-ray incident beam $K_I$ through the filter coating, in accordance with some embodiments. In some implementations, the substrate is perpendicular to the incident x-ray beam with wave vector, $K_I$. The microchannel 320 lies horizontally with respect to the beam, and vertical scans are used to confirm the attenuation of the incident x-rays in a pattern that correlates directly with a 4 mm long template. This evaluation provides evidence that more nanorods collect in the microchannels. As illustrated in this example, the x-ray scatters from the filter coating 1314 of nanorods with a final or scattered wave vector, $K_F$, at an angle $\phi$ with respect to the direction of the incident beam, $K_I$.

The scattering vector, Q, can be calculated by the difference in the scattered wave vector and the incident beam vector $(Q = K_F - K_I)$, with magnitude, $Q = 4\pi \sin (\phi/2)/k$, where $\lambda = 0.124$ nm is the x-ray wavelength. Further, in some implementations, the x-ray scatters with a scattering vector where the long axis parallels the channel length when S<0. Peaks in intensity, I, reveal structure in intensity versus scattering vector (I vs. Q) plots. In some embodiments, each SAXS line scan with point scan collection times of 120 seconds are obtained at points separated by about 0.25 mm over 2 mm. Parallel line scans can be taken inside and outside one or more microchannels. By analysis of scattering from the 2-D detector image 1312, and through a combination of Igor Pro with NIKA plug-in and Microsoft Excel, an order parameter or alignment factor was computed for different regions of the microchannel template.

Returning to Equation 1, repeated below, the alignment factor, S, can measure orientation at each point along a line scan.

$$S = \frac{-2\int_0^{\frac{\pi}{2}} I_{C,avg}(\theta) P_2(\cos(\theta)) \sin(\theta) d\theta}{\int_0^{\frac{\pi}{2}} I_{C,avg}(\theta) \sin(\theta) d\theta}. \quad \text{EQ. (1)}$$

The angle, θ, is the rotation angle in the detector plane (and substrate plane in transmission geometry). Again, $P_2(\theta)=(1/2)*(3\cos^2(\theta)-1)$, is the second Legendre polynomial. The combination of the azimuthally averaged intensity, $I_{C,avg}$, and $P_2(\theta)$ uncover the mean orientational ordering. The vertical axis of the detector (upwards in this example) is aligned with θ=0. In transmission geometry, the nanorod orientation parallel to the substrate can in some embodiments be probed. The short axis of the nanorods (i.e. width) may align with θ=90° and 270°, such that the long axis of the nanorods (i.e. length) are vertical with positive values for order (S>0). Alternatively, for the transmission SAXS illustration in FIG. 13, the depicted scattering would reflect that the long axis (i.e. length) is horizontal or parallel to the length of a microchannel during a scan, thus producing negative values of the alignment factor (S<0).

In some embodiments, nanorods (e.g., CdSe nanorods) having the aspect ratios and/or sizes identified in Table 4 above, are obtained and/or grown with dipoles along their length. These nanorod batches are dispersed in a solvent producing the nanorod infused solution, which is deposited onto the microchannel patterned substrate. The length of the nanorods is parallel to the extraordinary ray with refraction index, n, and permittivity, ε∥, i.e. $n=(\varepsilon\|)^{1/2}$, and consequently parallel to a liquid crystal (LC) director, $n_{LC}$, in well-aligned domains. Both the planar sample positioning between crossed polars and the uniaxial nanorod character suggests that optical birefringence correlates well with nanorod orientation. Principle estimates of alignment can, in some embodiments, be based on nanorod orientation that is in the plane of the channel substrate and relatively perpendicular or parallel (i.e. flow alignment) to the channel walls. The nanorod retaining methylcyclohexane—CdSe nanorod system enable, in some implementations, a straightforward preparation of dilute solutions with relatively high aspect ratio nanorods. Thus, Onsager's prediction that the onset of isotropic—nematic (I-N) phase coexistence (i.e. aligned nanorods) is easier to observe with dilute solutions of high aspect ratio nanorods (e.g., $\phi_{I-N}\sim(L/D)^{-1}$). Further, there are two coupled phase transitions, for the solvent and nanorods, so inter-particle interactions typically plays a role in observed alignment or order. Further, the uniformity in the color changes in the evaporating solution, observed in some embodiments, suggests good blending of CdSe nanorods and methylcyclohexane solvent as the concentration increases.

In some embodiments, optical birefringence is utilized in estimating average domain structure by human observation. Accordingly, polarized microscopy is utilized in some approaches in identifying and/or confirming nanorod orientation. FIGS. 14A-D show representative images illustrating polarized microscopy of a patterned substrate 212 with multiple microchannels 320, including a parallel (i.e., uncrossed) polarized image in FIG. 14A, a crossed polarized image in FIG. 14B, a rotated polarized parallel image in FIG. 14C, and a rotated crossed polarized image in FIG. 14D with a corresponding cross-sectional representation of a microchannel showing corner flows 1214 with dark threading in 100 μm microchannel middle (indicated by the arrow), in accordance with some embodiments.

Two representative observations are identified in view of sample polarized digital images of filter coating assemblies: 1) flow alignment resulting from an initial deposition, and 2) flow alignment resulting from solvent annealing. The assessment stems from the determination of the relative orientation angle, β, by use of Equation 10. Further, an examination of an orientational order parameter can summarize the full sampling for multiple regions of interest (ROI) along the length of one or more microchannels 320. Images captured in the polarized microscopy can, for example, contain 307,200=640×480 pixels, and ROIs contained 225=15×15 pixels for 80 μm wide microchannels; and 400=20×20 pixels for 100 um wide microchannels and for the region between channels.

Figure 14A:
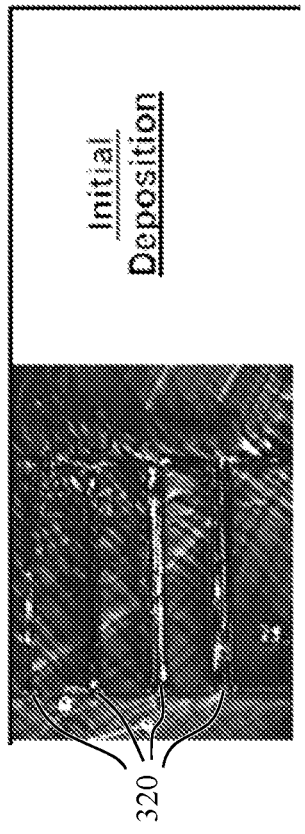
FIGS. 14A-D shows representative images illustrating polarized microscopy of a patterned substrate with multiple microchannels, in accordance with some embodiments.
Figure 14B:
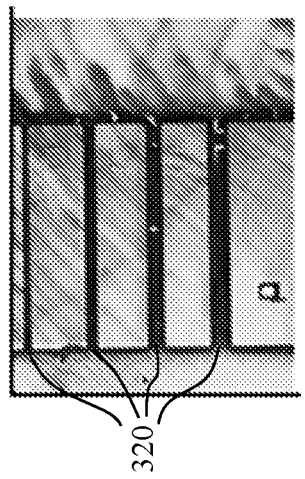
Figure 14C:
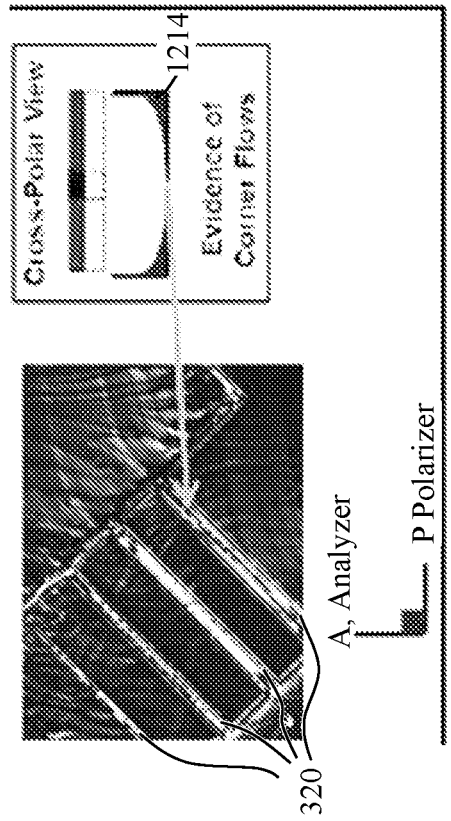
Figure 14D:
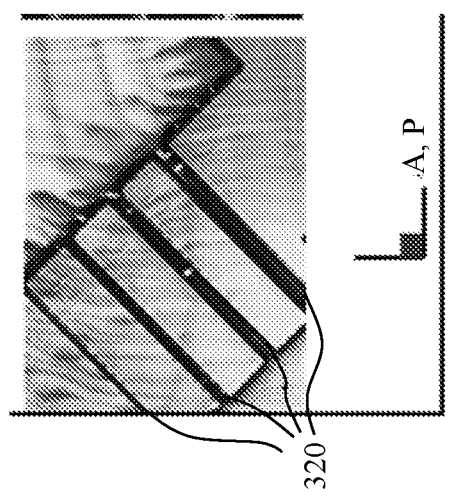

FIGS. 14A-D further highlight the optical birefringence and flow alignment from an initial deposition of nanorods with an aspect ratio L/D=12.4±3.5 in a 0.1 ml deposit of solution having a quantity of 2.96 initial wt. % of nanometers. As illustrated in FIGS. 14C and 14D, when the sample is rotated with the microchannels being oriented at 45° alignment relative to the scan, the wider 100 um microchannel reveals corner flows with a dark thread along the middle indicated by the arrow. In some instances, a dark thread might match a liquid crystalline nematic defect. In this instance, however, it is concluded otherwise based on the near absence of nanorod material, visible under uncrossed polars. As such, flow alignment can, in some implementations, be significant in at least 80 μm and 100 μm wide microchannels (adjacent microchannels in FIGS. 14A-D).

Figures 15A, 15B:
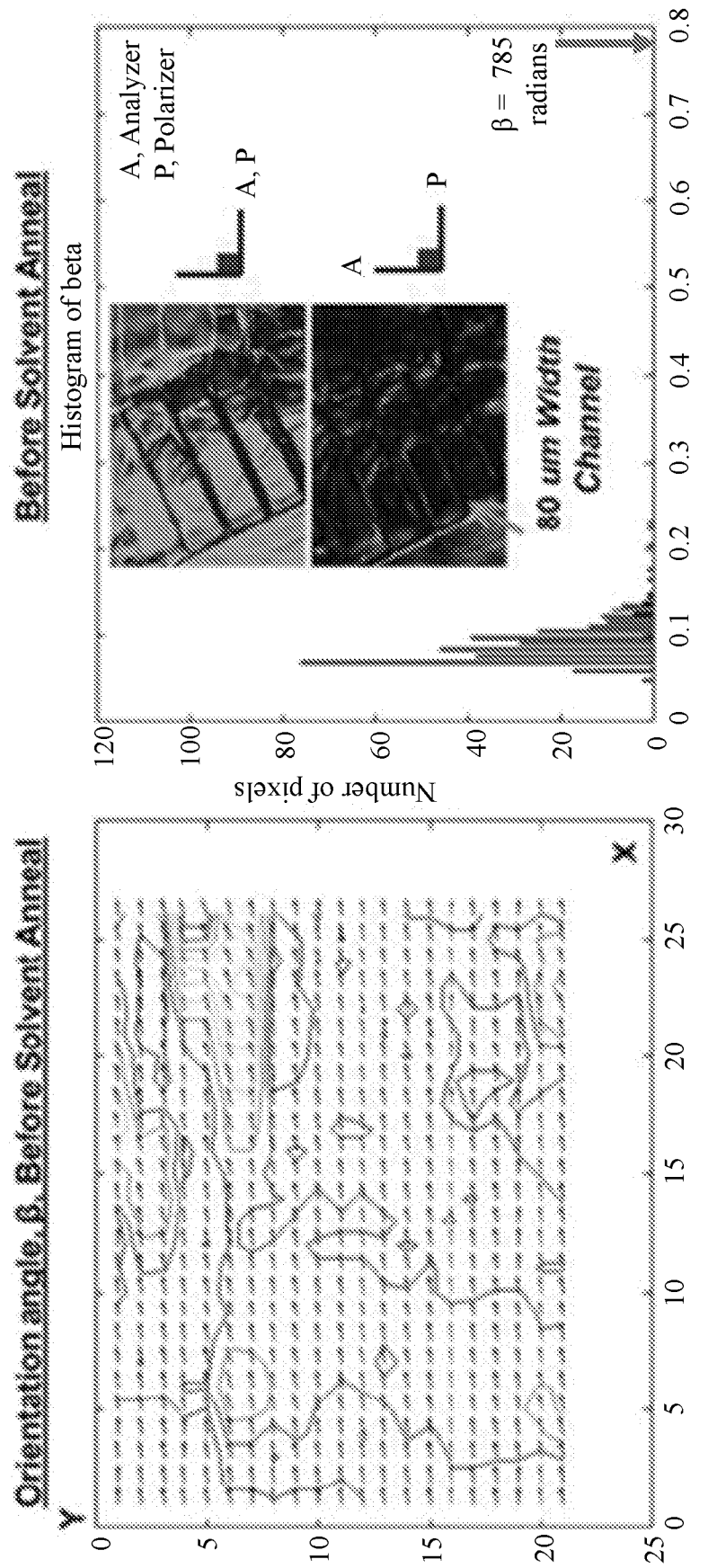
FIG. 15A shows a graphical representation of a plot of an X-Y map of director orientation per pixel with orientation for each ROI corresponding to a portion of a microchannel following an initial evaporation and deposit of nanorods, in accordance with some embodiments.
FIG. 15B shows a corresponding histogram indicating a number of pixels relative to an orientation angle indicated along the horizontal axis in radian measure for the corresponding portion of the microchannel, in accordance with some embodiments.

In some embodiments, an X-Y map of directors per pixel is plotted for each microchannel with orientation angle, β, for one or more ROI. FIG. 15A shows, in accordance with some embodiments, a graphical representation of a plot of an X-Y map of director orientation per pixel with orientation for each ROI corresponding to a portion of the 80 μm wide microchannel following an initial evaporation and deposit of nanorods with aspect ratio, (L/D)=13.1±3.4. FIG. 15B shows, in accordance with some embodiments, a corresponding histogram indicating a number of pixels relative to an orientation angle indicated along the horizontal axis in radian measure (β=0.785 radians (at 45° alignment)) for the corresponding portion of the 80 μm microchannel.

Figures 16A, 16B:
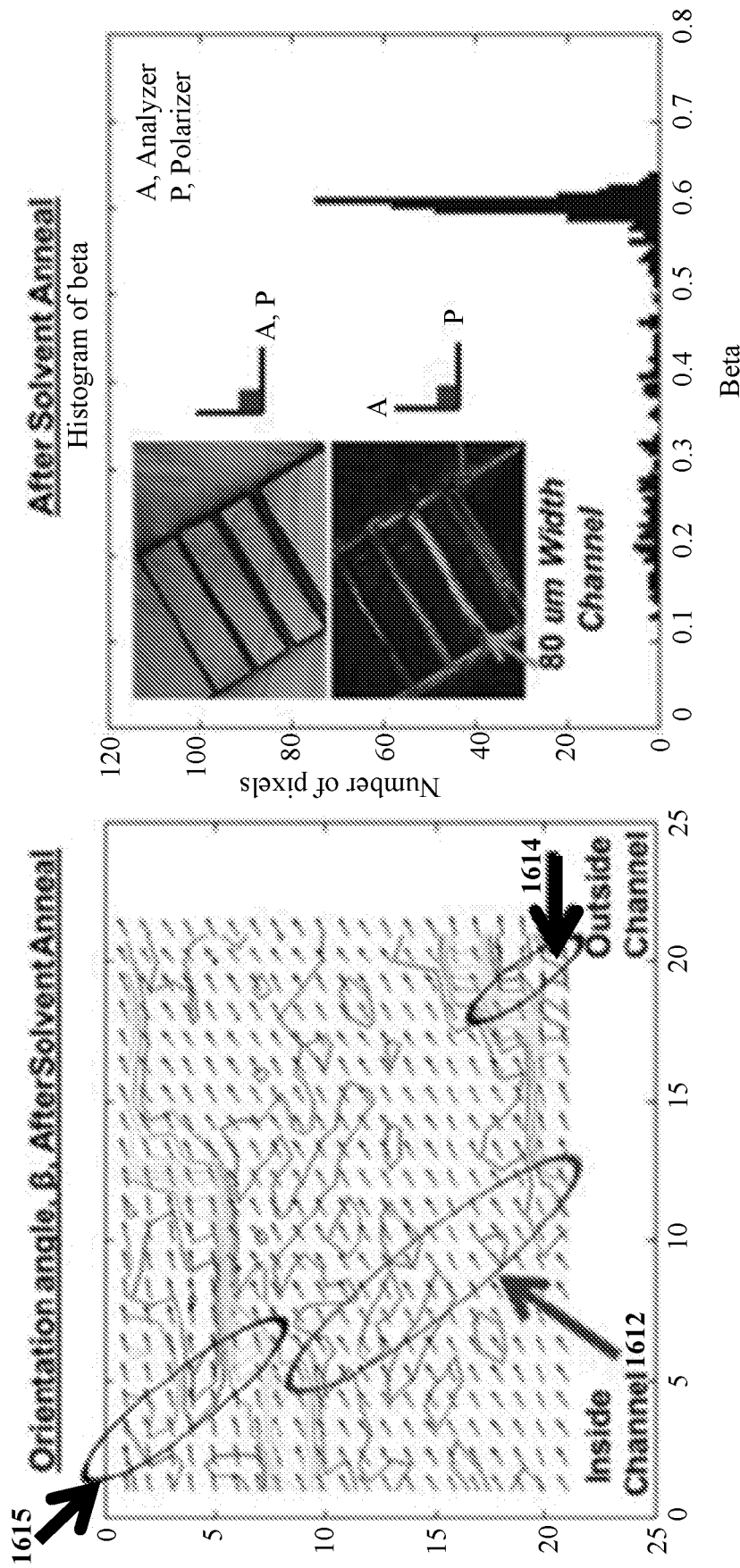
FIG. 16A shows a graphical representation of a plot of an X-Y map of director orientation per pixel with orientation for each ROI corresponding to a portion of a microchannel following a solvent annealing, in accordance with some embodiments.
FIG. 16B shows a corresponding histogram indicating a number of pixels relative to an orientation angle indicated along the horizontal axis in radian measure for the corresponding portion of the microchannel following the solvent annealing, in accordance with some embodiments.

Further, in some embodiments, an annealing process improves and/or enhances nanorod alignment. FIG. 16A shows a graphical representation of a plot of an X-Y map of director orientation per pixel with orientation for each ROI corresponding to a portion of the 80 μm wide microchannel following a solvent annealing, in accordance with some embodiments. FIG. 16B shows a corresponding histogram indicating a number of pixels relative to an orientation angle indicated along the horizontal axis in radian measure (β=0.785 radians (at 45° alignment)) for the corresponding portion of the 80 μm microchannel following the solvent annealing, in accordance with some embodiments.

The solvent annealing, in some implementations, highlights a general repainting property that results from adding the solvent to the dry nanorod filter coating assemblies. As seen in FIG. 15B, nanorods with aspect ratio, (L/D)=13.1±3.4, show nematic texture but no flow alignment after the initial deposition from a 0.1 ml of 2.65 wt. % solution. However, the same re-dried assembly after 0.16 ml of methylcyclohexane was added to increase the time for nanorods to organize in solvent, showed optical birefringence along the channel. In some instances, following the annealing corner flows were partly visible again in 100 um wide channels but mainly in regions near the channel ends. In each X-Y map, similarly aligned arrows and contour lines and shading highlight pixels with the same orientation angle. In FIG. 16A, the contour lines and shading distinguish between inside 1612 the microchannel and outside the microchannel 1614-1615, and group pixels with the same orientation angle (e.g., where some indicate a maximum β values, 0.6 (or 34.4°)).

Figure 17:
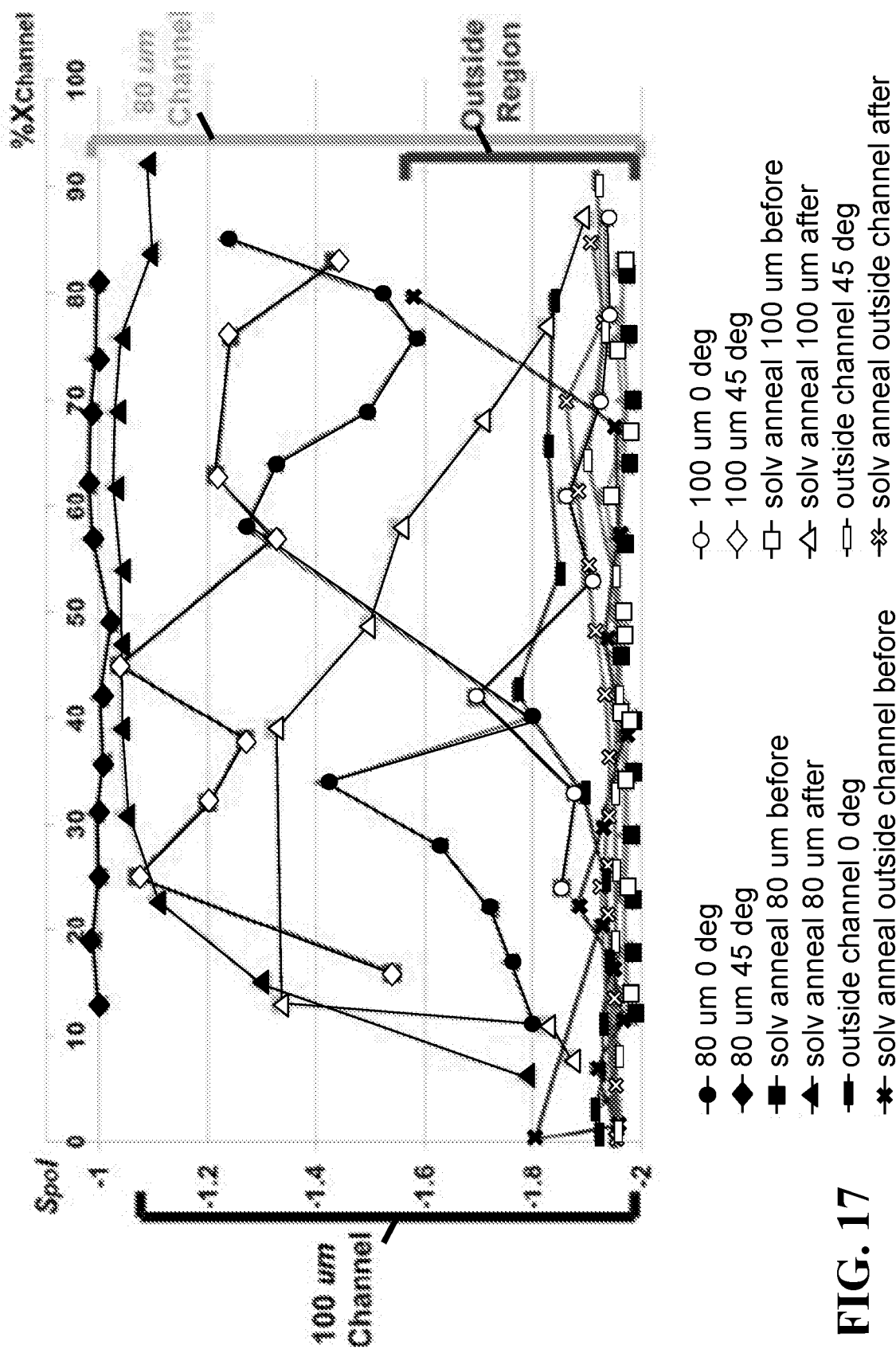
FIG. 17 illustrates a graphical representation of an orientational order parameter, $S_{POL}$, relative to a position along a width of microchannels, in accordance with some embodiments.

FIG. 17 illustrates a graphical representation of orientational order parameter, $S_{POL}$, relative to a position along a width of an 80 μm microchannel and a 100 μm microchannel, in accordance with some embodiments, for nanorods having an aspect ratio of 13.1±3.4 and consistent with those illustrated in FIGS. 15A-D and 16A-D. The orientational parameter $S_{POL}$ results from the regions of interest (ROI) information for 80 μm and 100 μm microchannels, and an outside region in between. The better alignment shown in the 80 μm microchannels is predicted to be due to the observed corner flow in 100 μm microchannels. Also, the 80 μm microchannels are in some instances less shallow with slightly higher depth/width ratio. Corner flows may result in the 80 μm wide microchannels, but are not easy to detect.

Again, small angle x-ray scattering (SAXS) can be performed to evaluate the nanorod filter coating assemblies within and/or outside the microchannels. An assessment of polarized microscopy provides numerical results consistent with the observed optical birefringence. However, the determination of flow alignment is biased by choice of the 45° diagonal referenced. SAXS is can be used, in some embodiments, to confirm alignment parallel (or perpendicular) to the microchannel wall. The flow aligning inferences made above may be justified for the relatively high aspect ratio nanorods, such as the higher aspect ratio nanorods presented in Table 4. In many instances, however, perpendicular alignment does occur with smaller aspect ratio nanorods, such as the smallest aspect ratio nanorods identified in Table 4. Below a method of computing the orientational order parameter, S, is described. Further, a parallel alignment and channel length correspondence is demonstrated. Additionally, the nanorod alignment in microchannels can be verified using S. Similarly, in some embodiments, the self-assembly on a bare substrate helps to explain the perpendicular alignment of nanorods within a microchannel.

Figure 18:
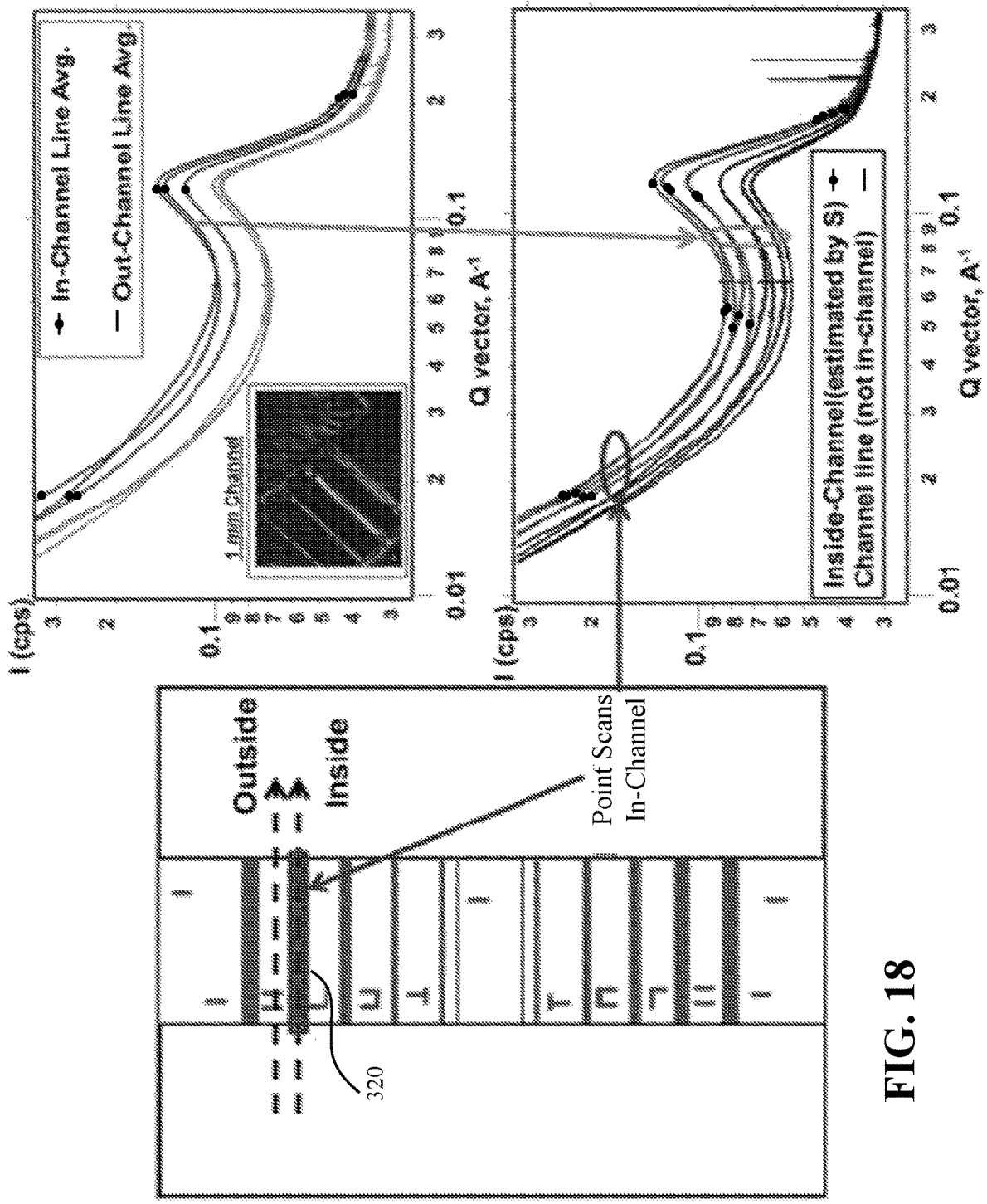
FIG. 18 shows graphical representations of exemplary scattering intensity relative to the scattering vector of SAXS scans of a nanorod filter coating both inside and outside of a microchannel for a solution, in accordance with some embodiments.

FIG. 18 shows a graphical representations of exemplary scattering intensity, I, relative to the scattering vector, Q, of SAXS scans of a nanorod filter coating both inside and outside of an 80 μm microchannel 320 for a solution having nanorods with average aspect ratio of about L/D=12.4±3.5. The SAXS is performed with the beam being directed substantially perpendicular to substrate and microchannels scanning along the length of the microchannel (e.g., from left to right in FIG. 18). A first graph (upper right) shows the I vs. Q line average, while the second graphic (lower right) shows the I vs. Q plot for point scans (in-channel). Accordingly, in some embodiments, the microchannel line scan is linked to the measured I vs. Q plots. SAXS line scans are performed horizontally, parallel to the channel. The analysis presented is for line scans of the 80 μm and 100 μm wide microchannels and regions in between or outside. In FIG. 18 the first graphic shows that the average in-channel line scans indicate a higher scattering intensity than outside-channel line scans. It is noted that in the second graphic (lower right), each curve matches a different point along the line scan.

Figure 19A:
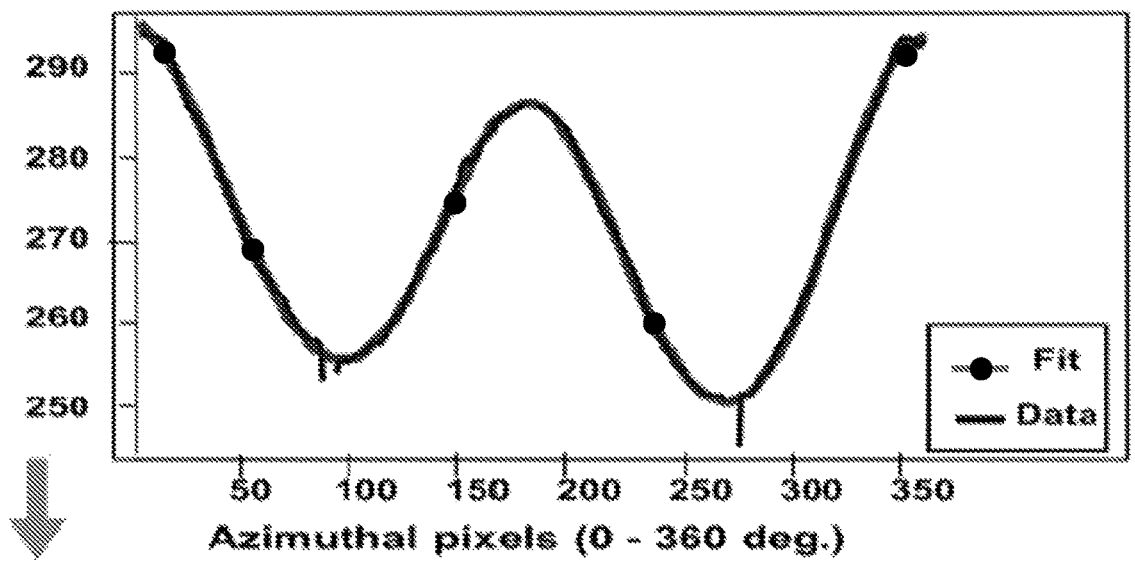
FIGS. 19A-B respectively illustrate graphical representations of parallel alignment and microchannel length correspondence, in accordance with some embodiments.
Figure 19B:
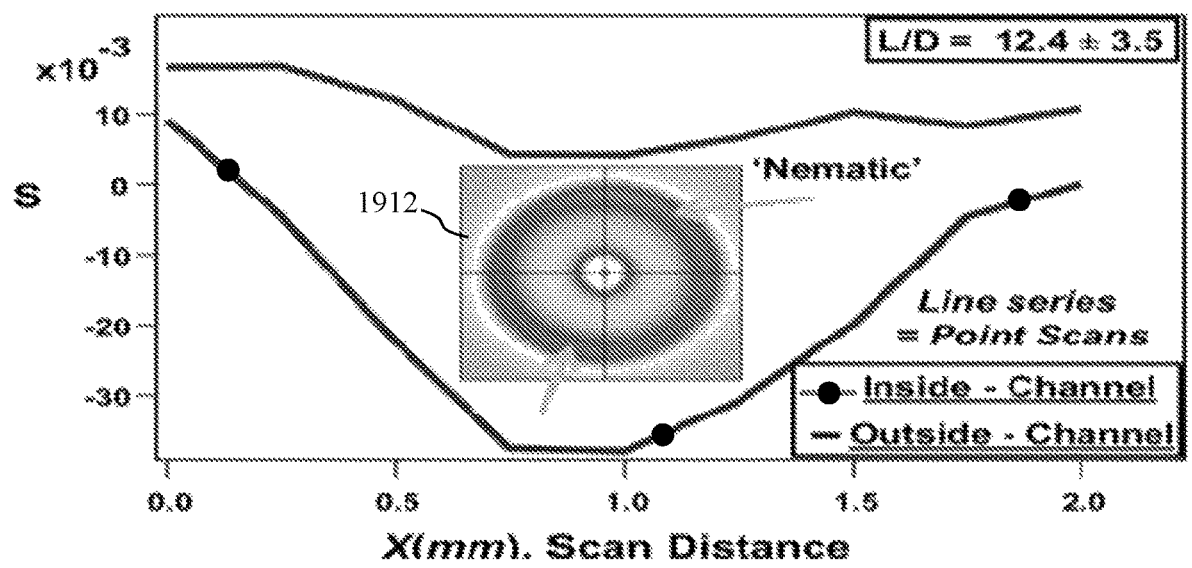

FIGS. 19A-B respectively illustrate graphical representations of parallel alignment and microchannel length correspondence, in accordance with some embodiments. Azimuthal information is used to compute the orientational order parameter, S. In FIG. 19A, the azimuthal intensity data selected empirically over a fixed Q-range is obtained from the 2-D detector image 1912 (FIG. 19B) using Igor Pro with Nika plug-in. Based on the lazimuthal vs. azimuthal angle, θ, the pixel averaged intensity, $I_{C(avg)}$, is established by a multiple Gaussian fit in FIG. 19A. Parallel alignment is indicated since θ=0° is the vertical reference and the peaks shown are at 0° and 180°.

The order parameter, S, calculated in FIG. 19B highlights each curve in the lower right graphic in FIG. 18 (lower Right). In FIG. 19B, the curve corresponding to inside the microchannel, the negative S values indicate order along the channel or flow direction (e.g., generally parallel with the length of the micro channel). FIG. 19B includes the 2-D detector image 1912 illustrating horizontal nanorod alignment. As a check, ordering is observed in a region X=0.5 mm to 1.5 mm, which matches the 1 mm microchannel length. The curves in the lower right graphic in FIG. 18 corresponding to scans within the microchannel illustrate a channel length correspondence. In addition, the in-channel curves show the highest scattered intensity, indicating that the capillary design through the use of the reservoirs succeed in trapping more material in the microchannels. And the characteristic spacing measured by scattering was approximately 5 nm which corresponds to the TEM widths equal to 3.7 nm±0.7 nm where the estimated (when considering HPA only) nanorod separation by ligand length equals 1.7 nm (or 0.85 nm when ligands overlap).

Figure 20:
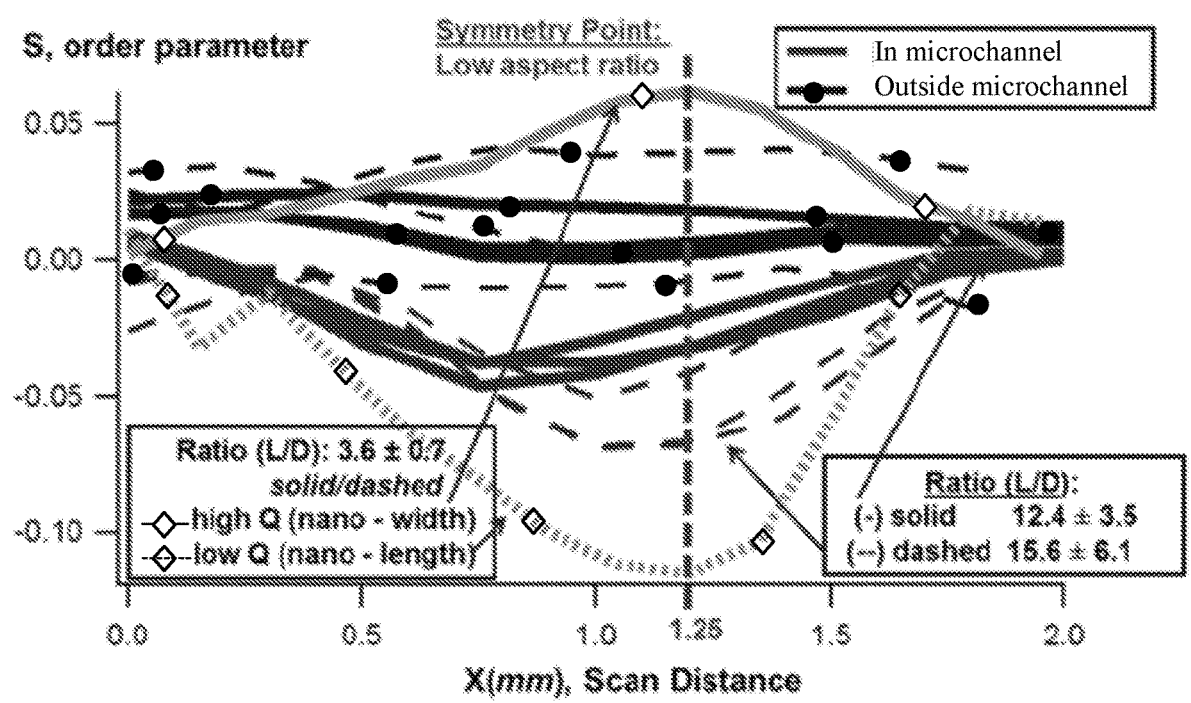
FIG. 20 shows a graphical representation of alignment factor versus a relative position along a scan distance from multiple batches of solutions having nanorods with differing average aspect ratios, in accordance with some embodiments.

Using evaporation to drive alignment in relatively large aspect ratio nanorods was demonstrated with alignment generally occurring perpendicular to the width of the microchannel. It is noted, however, that perpendicular alignment is achieved using smaller aspect ratio nanorods (e.g., nanorods having an aspect ratio of about 3.6±0.7 or less). FIG. 20 shows a graphical representation of alignment factor S versus a relative position, X % (mm), along a scan distance from multiple batches of solutions having nanorods with differing average aspect ratios, in accordance with some embodiments. Each S value shown is a 4-quadrant average. The alignment in large aspect ratio nanorods generally parallel with the microchannel length and the perpendicular alignment of the smaller aspect ratio nanorods are indicated by the S vs. X(mm) graph FIG. 20. As illustrated in FIG. 20, inside the microchannel and outside the microchannel matches the high Q (width) peak for larger aspect ratio nanorods. For smaller aspect ratio nanorods (e.g., 3.6±0.7 or lower), the curves match high Q and low Q (length) peaks respectively. Further, crystal-like ordering or increases in positional ordering occurred since both high Q (width) and low Q (length) SAXS peaks were observed with maximal S-values occurring at the same point, X=1.25 mm.

Thus, ordering of the long-axis and short-axis is coupled as expected for a single nanorod. The decay away from X=1.25 mm in the absolute S value along X (mm) suggests an absence of material toward the ends of the microchannel which would explain near mirror symmetry demonstrated by the curves corresponding to the lower aspect ratio nanorods (indicated with diamonds in FIG. 20). FIG. 20 further includes the scans for high aspect ratio nanorods (e.g., L/D=12.4±3.5, and L/D=15.6±6.1) that show in-channel parallel alignment.

Figure 21:
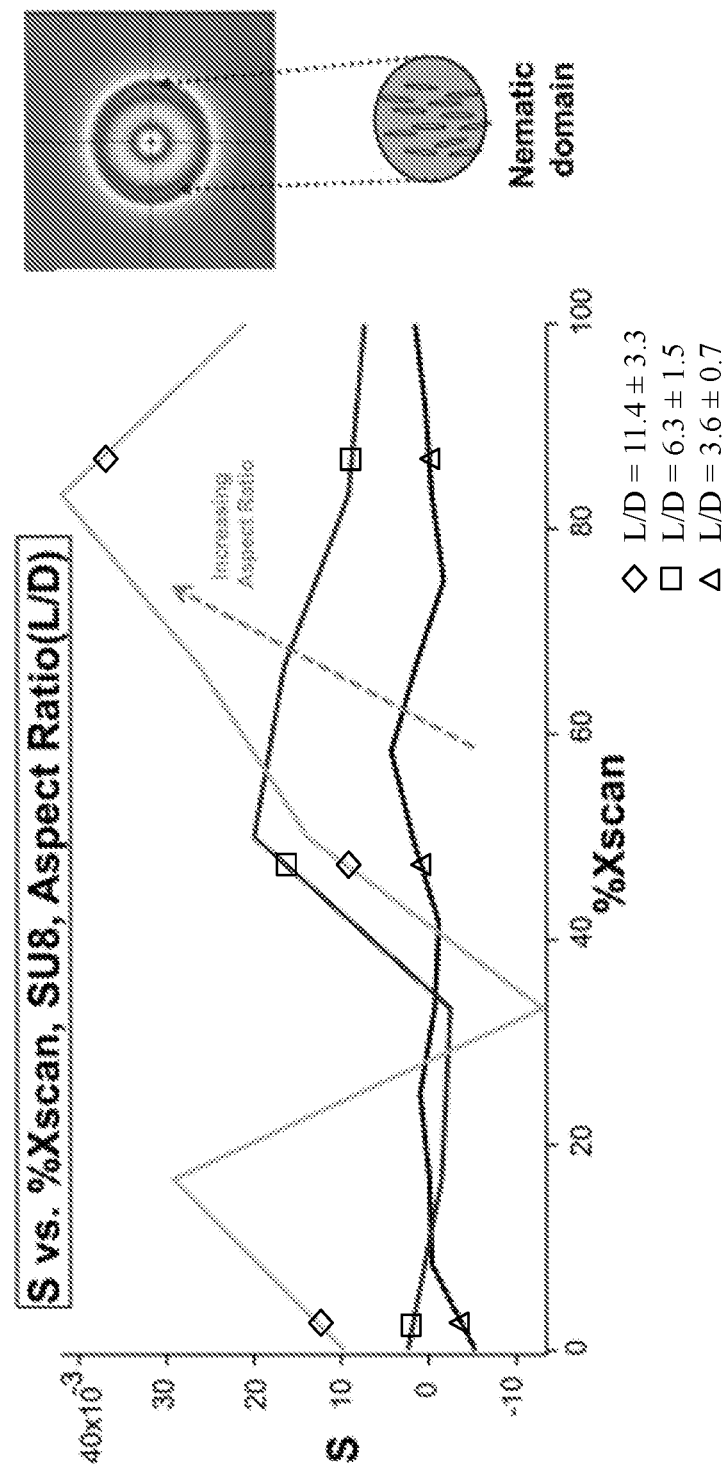
FIG. 21 shows a graphical representation of alignment factor versus a relative position along an axis or diameter of filter coating assemblies formed on a flat substrate from the multiple batches of solutions having nanorods with differing average aspect ratios, in accordance with some embodiments.

When microchannels are not used, as described above, some embodiments achieve circular dry filter coating assemblies on bare substrates. For example, batches of solutions with dispersed nanorods having aspect ratios of L/D=11.4±3.3; L/D=6.3±1.5; and L/D=3.6±0.7 can be deposited on a flat substrate and evaporation controlled to form a filter coating with nanorods aligned generally parallel with the vapor contact line. FIG. 21 shows a graphical representation of alignment factor S versus a relative position, X % (mm), along an axis or diameter of filter coating assemblies formed on a flat substrate from the multiple batches of solutions having nanorods with differing average aspect ratios, in accordance with some embodiments. A diameter line scans is performed and observed that nanorods mainly order perpendicular to the scan direction. In some implementations, assembly orders more with increasing aspect ratio.

Alignment parallel to the receding solution-substrate-vapor contact line during evaporation is consistent with minimization of the interfacial free energy at the solution-substrate-vapor interface. The competition between fluid recession during drying and channel wetting may provide at least some explanation of the result with small aspect ratio rods in shallow channels. The contact line along the channel floor may recede faster at the channel ends than the volume fraction can increase. To reach the nematic phase sooner, an increase in the initial solution concentration may be utilized in some implementations.

Accordingly, in some embodiments, alignment of nanorods of semiconducting materials is achieved through controlled evaporation. In some embodiments, a drop-casting of dilute nanorod solutions is performed in microchannels, which can result in compact and aligned nanorods on a millimeter length scale. An assessment of alignment can utilize indirect (polarized microscopy) and direct measurement (small angle x-ray scattering) of nanorod assemblies confirming orientational and positional ordering within microchannels, supporting sub-mm placement of nanorods. The collective nanorod phase behavior impacts nm to mm scale order. Further, a repainting or solvent annealing process can be employed.

As described above, the nanorods can be obtained from a third party and/or generated according to known techniques. In some embodiments, CdSe nanorods are prepared by a known recipe to promote high aspect ratio rods, where the nanorods polydispersity and aspect ratio is defined by greater length variability. For example, a recipe can be followed to obtain CdSe nanorods comprising: Surfactants, 3.53 g TOPO (Tri Octyl Phosphine Oxide), 0.109 g HPA (Hexyl Phosphonic Acid), 0.360 g TDPA (Tetra Decyl Phosphonic Acid), and Precursors, 0.5 g of 32/33% wt. $CdMe_2$/TBP (Dimethyl cadmium/Tributyl-phosphine), 2.5 g of 7.78% wt. Se/TBP (Selenium/Tributyl-phosphine). Longer nanorods are obtained in some instances by multiple injections of a cadmium rich solution added during the nanorod's growth phase. For examples, 5 injections, 1 ml of 5.8% Cd/1.6% Se/TBP solution added slowly over 5-10 minutes at 10 minute intervals.

Evaporation is used to increase the nanorod volume fraction toward a nematic phase to quickly align nanorods on device scales. A statistical assessment of alignment in relatively shallow microchannels, using image analysis by polarized microscopy and SAXS, to observe and confirm alignment.

Device scale integration of nanorods continues to advance on micrometer and millimeter scales. The nanorod shape enables preferential absorption and emission. Some embodiments may be used with nanorod device integration to change refraction index. Further, some embodiments concentrate nanorods (e.g., CdSe nanorods) by evaporation to form a liquid crystal phase to effect alignment in devices.

EXAMPLE 3

Again, the preparation of the nanorods and/or the nanorod dispersed solution can be importation in achieving the desired nanorod alignment and deposited filter coating. In some embodiments, the nanorods are prepared prior to combining the nanorods to the solvent to obtain batches of the solution comprising the solvent and the desired amount of nanorods.

A synthesis product (e.g., excess surfactant, Cadmium phosphonate polymer, unreacted product, CdSe nanorods, and/or other such material may be used) is dispersed in hexane. For example, synthesis product can be dispersed in approximately 12.6 ml hexane in 20 ml vials under room temperature conditions (e.g., 20° C.). The mixture can then be divided into multiple separate volumes. For example, multiple volumes of approximately 2.1 ml are separated. Approximately 5-6 ml of 2-propanol is added to each separate volume. Each separate volume with added propanol can then be subjected to centrifuging, such as for about 5 minutes at 4000 rpm. After centrifugation, clear or sometimes cloudy supernatant is decanted. The precipitate can then be redispersed in hexane. For example, each sample of precipitate from the separate volumes is redispersed in approximately 2.1 ml of hexane and the centrifugation is repeated (e.g., for 5 minutes at 4000 rpm). The supernatant is decanted. In some implementations, the procedure above is repeated with the precipitate being redispersed in hexane, subjected to centrifugation and supernatant decanted. The precipitate and/or volumes of solutions are dried. In some instances, the drying is performed under nitrogen ($N_2$) flow. For example, the drying can be performed for 12 or more hours. In some instances, the vial or container, used when focus is on precipitate that survive centrifugation and is later redispersed, is initially weighed so that final nanorod weight can be measured properly by a net subtraction method.

The dried nanorods are subsequently redispersed in cyclohexane. For example, in some instances each sample of nanorods from the different vials is redispersed in approximately 2 ml of cyclohexane. The samples are subjected to centrifugation (e.g., for 5 minutes at 4000 rpm), which in some instances can eliminate non-solvating nanorods. For these steps, the focus is now on the supernatant for solvation purposes. Supernatant is transferred through a fluid extraction method using alcohol cleaned and dry disposable glass pipettes, and centrifugation is resumed (e.g., 5 minutes at 4000 rpm). This step can be repeated one or more times and then solutions are allowed to sediment for a period of time, such as 12 hours or more. In some embodiments, during the sedimentation period, the vials are closed with septa seal and wrapped in parafilm. The sedimentation can be performed at substantially any relevant temperature, and typically at room temperature (e.g., about 20° C.). The centrifugation can be repeated one or more times, and typically at least twice more (e.g., 5 minutes at 4000 rpm) with supernatant transfers preformed (again, the focus is on the nanorods that remain in solution such that the nanorods can be transferred with minimal contamination using fluid transfer). The transferred supernatant can be subject to a sedimentation period, such as a period of greater than one week, and typically a 2-week or more sediment period. Typically, the sedimentation is performed at room temperature (e.g., about 20° C.), and without refrigeration, freezing, or heat. Supernatant is removed and solutions are then dried under (e.g., under a nitrogen ($N_2$) flow).

The obtained nanorods are then dispersed in a target solvent (e.g., methylcyclohexane). In some embodiments, after drying, the nanorods are weighed in previously weighed vials. An amount of target solvent (e.g., 2-3 ml of target solvent) is added to nanorod precipitate. The resulting solution and/or desired concentration of nanorods is determined (e.g., <3 wt. % of nanorods is determined precisely by weight, amount of solvent, and or further dilution). In some embodiments, the solutions are subjected to centrifugation (e.g., 5 minutes at 4000 rpm), and supernatant transferred. The centrifugation and supernatant transfer can be repeated one or more times. Nanorods are allowed to sediment 12 hours or more (e.g., overnight). Some embodiments repeat the centrifugation and supernatant is transferred one or more times (e.g., twice more).

Solutions are dried again using nitrogen, and nanorod weights (which in some instances are approximately 20 mg or less) are determined. The cleaned and prepared nanorods can then be dispersed into the target solvent producing the desired batches of solution. For example, the samples of nanorods can be dispersed in 2-3 ml of the target solvent, such as adding the desired volume of methylcyclohexane to each sample vial thus establishing the multiple stock batches of solutions. In some embodiments, one or more additional vials may be prepared for sampling. For example, to perform Transmission Electron Microscopy (TEM) analysis, two additional sample vials may be prepared by dilution using the target solvent.

Resulting nanorod alignment, in some embodiments, is identified and/or estimated through optical birefringence from the resulting dry nanorod filter coating assemblies. Accordingly, alignment may be informally identified through visual inspection assisted by the polarizing microscope. Further, some embodiments confirm and/or measure alignment with the SAXS using scattering information through an intensity weighted and computed order parameter.

The filter coating provides desired light absorption and/or filtering. Accordingly, the application of the filter coating to a substrate can have wide reaching applications, such as but not limited to LEDs, lighting, lasers and other such applications. For example, photonic paint with infra-red absorber capability may be provided. It is believed that the nanorod is not necessarily supporting surface-phonon polariton modes but adds a selective absorbance enhancement, such as in the IR spectrum, with incidental impact on energy density linked to a substrate's surface phonon polariton property. It is also believed that nanorod orientation provides an effective surface phonon-polariton surface structure with couple IR and near IR sensitivity.

The application of aligned nanorods can, in some implementations, form a surface layer with surface phonon polariton properties on a substrate. The density of surface phonon polariton modes supported in the aligned nanorod layer can be tuned by adjusting the percentage of aligned nanorods, because the density of surface phonon polariton modes in the aligned nanorod layer is often related to the surface phonon polariton transmission, which is proportional to nanorod alignment, and/or the nanorod layer absorptivity (a physical property). Further, the application and alignment of the nanorod layer at a substrate surface can cause the density of surface phonon polariton modes at the substrate surface to increase in direct proportion to the nanorod absorptivity. A substrate with an aligned nanorod layer is thus enabled with surface phonon polariton properties, and can be used alone as a selective infrared absorber or emitter, or used with surface phonon properties (e.g., used with a surface phonon based temperature measuring apparatus).

Figure 22:
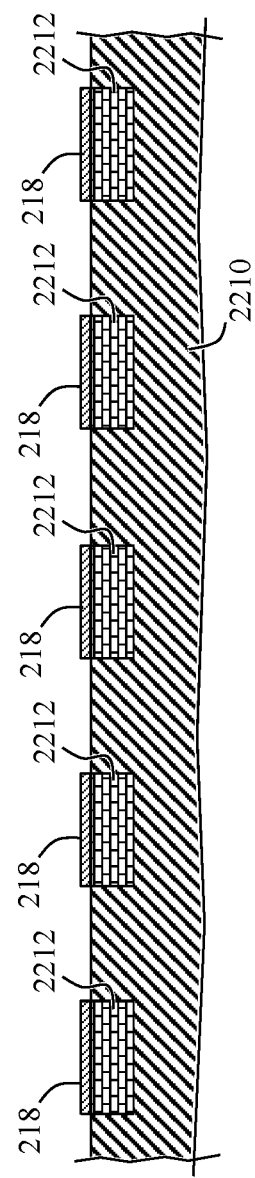
FIG. 22 shows a simplified cross-sectional view of a portion of a wafer substrate that is processed to include multiple optical devices, with a filter coating associated with each optical device, in accordance with some embodiments.

The filter coating 218 can be utilized in numerous applications. In some implementations, the filter coating 218 comprising the aligned nanorods may be used in wafer and/or chip processing. In some implementations, wafer and/or chip processing includes a process of applying a nanorod infused solution onto specific positions and/or over areas of a smooth and/or patterned wafer surface and evaporation is implemented to develop a desired filter coating. For example, filter coatings and/or an optical filtering layer can be formed with light emitting diodes (LEDs), photodiodes, and/or others such devices. FIG. 22 shows a simplified cross-sectional view of a portion of an example wafer substrate 2210 that has been processed to include multiple optical devices 2212 (e.g., LEDs, photodiodes, etc.), with a filter coating 218 formed proximate to and associated with each optical device, in accordance with some embodiments. In other embodiments, one or more filter coatings 218 may extend over more than a single optical device. Accordingly, some embodiments can provide absorbers (infrared absorber), anti-reflective coatings, polarized filters, portions of selective or multi-selective absorbers, and other applications. Again, in some embodiments nanorod alignment can be dependent at least in part on volume fraction, which can depend on temperature. As such, passive control of surface phonon polariton transmission can be achieved by controlling the temperature of the solution. A gradient of alignment with an increased alignment of the nanorods approaching a central area (e.g., about a central axis 220) of the aligned deposit of the nanorods can be used with other embodiments to develop surface phonon polariton lenses, since the transmission direction is affected by the gradient of alignment. Also, infrared light generated by thermal radiation incident on the aligned nanoparticles layer can cause surface phonon polaritons to form in the nanoparticle layer. Thus, passive control and lensing of surface phonon polaritons can be used with other embodiments to develop thermal rectifiers, localized heat spreaders, thermal lenses, and other such applications. As described herein, in some implementations, the coincident Langmuir adsorption isotherm and alignment establishes the basis for the gradient in alignment and the amount of nanorods deposited.

Some embodiments provide one or more nanorod or nanoparticle coatings or layers having surface phonon polariton coupling properties described by a coupling length. The coupling length, in some implementations, is equivalent to a scale of surface phonon polariton propagation, in the nanorod layer. Further, a coupling length scale can be defined, at least near the near the Ioffe-Regel limit, as:

$$\omega_{SPP}\tau \sim 1$$

where $\omega_{SPP}$ is the surface phonon polariton frequency, and $\tau$ is its relaxation time, which in some implementations is define as the inverse of the infrared light damping constant, $\Gamma$ (a material property of the nanorod coating or material), or $\tau = \Gamma^{-1}$. Near an Ioffe-Regel limit, the surface phonon coupling scale (or scale of propagation) is approximately equal to the distance, d, between the centers of neighboring nanorods or other such nanoparticles. The distances, d (i.e. the coupling scale), depends on nanorod aspect ratio and distances between nanorods, which can be controlled and estimated as described herein, and the nanorod length (e.g., of about <70 nm) serves as a coupling length or scale of propagation describing the interface supporting surface phonon polariton activity. Some embodiments in providing the aligned deposit of the nanorods form a nanorod layer having surface phonon polariton coupling properties dependent upon a coupling length in the nanorod layer corresponding to a scale of surface phonon polariton propagation, wherein the coupling length scale is proportional to a distance between centers of neighboring nanorods.

Further, in some implementations, nanorod or nanoparticle coatings have a thickness $\delta_{coat}$, which are typically much less than the surface phonon polariton wavelength (e.g., $\lambda_{SPP} = c/\omega_{SPP} \gg \delta_{coat}$), and will have surface phonon polariton coupling properties characterized by an enhancement in electromagnetic field intensity concentrated at the nanorod layer. In some implementations, the electromagnetic field intensity observed, for example when infrared light directed at the nanorod coating SPP frequency propagating through the substrate 212, which has an refractive index $n_0$, at an angle $\theta_0$, and incident on a surface of a coating layer of thickness $\delta_{coat}$, with $\lambda_{SPP} \gg \delta_{coat}$ coat and complex refractive index $n_1$, increases by an enhancement factor define by:

$$F_{thin} = \text{Re}\left[\frac{n_0 \cos\theta_0}{n_1 \sqrt{1 - \left(\frac{n_0}{n_1}\sin\theta_0\right)^2}}\right]^2$$

Typically, the upper limit on surface phonon enhancement for a thin coating (e.g., $\lambda_{SPP} \gg \delta_{coat}$) can be estimated using the enhancement factor, $F_{thin}$, and in some implementations may represent an upper limit on surface phonon polariton enhancements in films of at least some thicknesses, such as at least some of the coatings described herein (e.g., some that are measured to be 9 μm to 20 μm and experience an SPP enhancement less than $F_{thin}$). Film enhancements $F_{thin}$) can thus be tuned in accordance with the methods described herein, which show that the stacking height changes are indicated by both the Langmuir adsorption isotherm and profilometry. Some embodiments in providing an aligned deposit of the nanorods form a coating of nanorods having a thickness that is less than a surface phonon polariton wavelength and with surface phonon polariton coupling properties comprising an enhanced electromagnetic field intensity limited by an enhancement factor.

The described features, structures, or characteristics of the invention may be combined in any suitable manner in one or more embodiments. In the following description, numerous specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept.

The following description is not to be taken in a limiting sense, but is made merely for the purpose of describing the general principles of exemplary embodiments. The scope of the invention should be determined with reference to the claims.

What is claimed is:

1. A method of applying a filtering coating to a substrate, comprising:
    depositing a solution on a surface of a substrate, wherein the solution comprises an organic solvent with nanorods dispersed within the solvent, wherein the nanorods comprise cadmium selenide (CdSe) nanorods;
    allowing evaporation of the solution to increase a volume fraction of the nanorods in the solution as a function of the evaporation; and
    providing an aligned deposit of the nanorods, as a function of the evaporation, wherein the aligned deposit of nanorods comprises thousands of the nanorods with at least a majority of the nanorods aligned relative to a length of the nanorods;
    wherein the organic solvent comprises methylcyclohexane;
    wherein the evaporation of the solution induces depositing the aligned nanorods along a periphery of the deposited solution as a periphery of the solution recedes across the substrate during evaporation with the majority of aligned nanorods aligning generally parallel with an exterior perimeter of the deposited solution; and
    wherein the nanorods comprise nanorods having an average aspect ratio equal to or greater than 4.8 and equal to or smaller than 15.9, wherein an aspect ratio of each nanorod is defined by a length of the nanorod divided by a width of the nanorod,
    wherein the length of the nanorod is 17.9 nm to 56.7 nm, and the width of the nanorod is 3.0 nm to 4.8 nm,
    wherein an inverse of solution volume is smaller than 9,
    wherein the depositing the solution comprises (i) a dropcasting of the solution using a microchannel, and (ii) measuring an orientational and positional ordering of the nanorods within the microchannel by measuring optical birefringence using a quartz wafer or by measuring Small-angle X-ray scattering (SAXS) using the quartz wafer, the microchannel having a depth/a width of from 0.2 to 0.25,
    wherein the evaporation of the solution is induced by flowing a gas over the surface of the substrate at between 80 and 100 feet per minute,
    wherein the solvent or the solution is additionally applied to the surface of the substrate during the evaporation, and
    wherein a solvent annealing is performed after the step of allowing evaporation of the solution.

2. The method of claim 1, wherein the nanorods comprise less than 4% by weight of the solution.

3. The method of claim 1, wherein the providing the aligned deposit of the nanorods comprises achieving alignment of the nanorods in less than 10 minutes from deposition of the solution on the surface per 0.10 ml of solution deposited on the substrate.

4. The method of claim 1, wherein the allowing the evaporation comprises completing the evaporation within less than 30 minutes per 0.10 ml of solution deposited on the substrate.

5. The method of claim 1, wherein the depositing the solution on the substrate comprises depositing a volume that is less than 0.50 ml onto a surface of the substrate.

6. The method of claim 1, wherein an alignment of the majority of the nanorods comprises a gradient of alignment with an increased alignment of the nanorods approaching a central area of the aligned deposit of the nanorods.

7. The method of claim 1, further comprising:
    tuning an optical filtering effect resulting from the aligned deposit of the nanorods comprising:
    identifying lyotropic aspects corresponding to one or more types of potential nanorods;
    establishing a predicted alignment of each of the one or more types of potential nanorods as a function of the lyotropic aspects of the one or more types of potential nanorods; and
    selecting, based on the predicted alignment, one or more of the potential nanorods.

8. The method of claim 7, wherein the establishing a predicted alignment comprises estimating an isotropic-nematic phase coexistence based on a small angle x-ray scattering characterization of aligned nanorods.

9. The method of claim 1, further comprising:
cleaning a first stock of the nanorods comprising: repeating a series of dispersions of the first stock in hexane and centrifuging producing cleaned nanorods;
preparing, following the cleaning of the first stock, the cleaned nanorods to obtain prepared clean nanorods by repeating multiple times a series of: dispersing the cleaned nanorods in the methylcyclohexane producing a preliminary solution, centrifuging the preliminary solution and transferring the supernatant of the preliminary solution following the centrifuging; and
dispersing a first weighted quantity of the prepared clean nanorods in a first predefined volume of the organic solvent producing the solution comprising the organic solvent and the nanorods at less than 4% by weight.

10. The method of claim 1, wherein the depositing the solution on the substrate comprises depositing the solution in a reservoir formed at a first end of one or more microchannels each having a width of less than 200 μm; and
wherein the providing the aligned deposit of the nanorods comprises providing the alignment with the lengths of a majority of the nanorods being aligned substantially perpendicular with a length of the one or more microchannels.

11. The method of claim 1, wherein the allowing the evaporation comprises inducing evaporation by maintaining an airflow over the surface.

12. The method of claim 11, wherein the maintaining the airflow over the surface comprises maintaining an airflow of between 80 and 100 feet per minute (fpm).

13. The method of claim 1, wherein the microchannel has a water contact angle about 85°.

14. A method of applying a filtering coating to a substrate, comprising:
depositing a solution on a surface of a substrate, wherein the solution comprises an organic solvent with nanorods dispersed within the solvent, wherein the nanorods comprise cadmium selenide (CdSe) nanorods;
allowing evaporation of the solution to increase a volume fraction of the nanorods in the solution as a function of the evaporation; and
providing an aligned deposit of the nanorods, as a function of the evaporation, wherein the aligned deposit of nanorods comprises thousands of the nanorods with at least a majority of the nanorods aligned relative to a length of the nanorods;
wherein the depositing the solution on the substrate comprises depositing the solution in a first reservoir formed at a first end of one or more microchannels each having a width of less than 200 um, wherein an average length of the nanorods is greater than 25 nm;
wherein the providing the aligned deposit of the nanorods comprises providing the alignment with the lengths of a majority of the nanorods being aligned substantially parallel with a length of the one or more microchannels; and
wherein the nanorods comprise nanorods having an average aspect ratio equal to or greater than 4.8 and equal to or smaller than 15.9, wherein an aspect ratio of each nanorod is defined by a length of the nanorod divided by a width of the nanorod,
wherein the length of the nanorod is 17.9 nm to 56.7 nm, and the width of the nanorod is 3.0 nm to 4.8 nm,
wherein an inverse of solution volume is smaller than 9,
wherein the depositing the solution comprises (i) a drop-casting of the solution using the one or more microchannels, and (ii) measuring an orientational and positional ordering of the nanorods within the one or more microchannels by measuring optical birefringence using a quartz wafer or by measuring Small-angle X-ray scattering (SAXS) using the quartz wafer, the one or more microchannels having a depth/a width of from 0.2 to 0.25,
wherein the evaporation of the solution is induced by flowing a gas over the surface of the substrate at between 80 and 100 feet per minute,
wherein the solvent or the solution is additionally applied to the surface of the substrate during the evaporation, and
wherein a solvent annealing is performed after the step of allowing evaporation of the solution.

15. The method of claim 14, wherein each of the one or more microchannels has a water contact angle about 85°.

16. A method of applying an optical filtering coating to a substrate, comprising:
depositing a solution on a surface of a substrate, wherein the solution comprises an organic solvent with nanorods dispersed within the solvent;
allowing evaporation of the solution to increase a volume fraction of the nanorods in the solution as a function of the evaporation;
achieving alignment of the nanorods in less than 10 minutes from deposition of the solution on the surface per 0.10 ml of solution deposited on the substrate; and
providing an aligned deposit of the nanorods, as a function of the evaporation, wherein the aligned deposit of nanorods comprises thousands of the nanorods with at least a majority of the nanorods aligned relative to a length of the nanorods;
wherein the evaporation of the solution induces depositing the aligned nanorods along a periphery of the deposited solution as a periphery of the solution recedes across the substrate during evaporation with the majority of aligned nanorods aligning generally parallel with an exterior perimeter of the deposited solution; and
wherein the nanorods comprise nanorods having an average aspect ratio equal to or greater than 4.8 and equal to or smaller than 15.9, wherein an aspect ratio of each nanorod is defined by a length of the nanorod divided by a width of the nanorod,
wherein the length of the nanorod is 17.9 nm to 56.7 nm, and the width of the nanorod is 3.0 nm to 4.8 nm,
wherein an inverse of solution volume is smaller than 9,
wherein the depositing the solution comprises (i) a drop-casting of the solution using a microchannel, and (ii) measuring an orientational and positional ordering of the nanorods within the microchannel by measuring optical birefringence using a quartz wafer or by measuring Small-angle X-ray scattering (SAXS) using the quartz wafer, the microchannel having a depth/a width of from 0.2 to 0.25,
wherein the evaporation of the solution is induced by flowing a gas over the surface of the substrate at between 80 and 100 feet per minute,
wherein the solvent or the solution is additionally applied to the surface of the substrate during the evaporation, and
wherein a solvent annealing is performed after the step of allowing evaporation of the solution.

17. The method of claim 16, wherein the nanorods comprise less than 4% by weight of the solution.

18. The method of claim 16, wherein the organic solvent comprises methylcyclohexane.

19. The method of claim 18, wherein the nanorods comprise cadmium selenide (CdSe) nanorods.

20. The method of claim 18, further comprising:
cleaning a first stock of the nanorods comprising: repeating a series of dispersions of the first stock in hexane and centrifuging producing cleaned nanorods;
preparing, following the cleaning of the first stock, the cleaned nanorods to obtain prepared clean nanorods by repeating multiple times a series of: dispersing the cleaned nanorods in the methylcyclohexane producing a preliminary solution, centrifuging the preliminary solution and transferring the supernatant of the preliminary solution following the centrifuging; and
dispersing a first weighted quantity of the prepared clean nanorods in a first predefined volume of the organic solvent producing the solution comprising the organic solvent and the nanorods at less than the 4% by weight.

21. The method of claim 16, wherein an alignment of the majority of the nanorods comprises a gradient of alignment with an increased alignment of the nanorods approaching a central area of the aligned deposit of the nanorods.

22. The method of claim 16 wherein the providing the aligned deposit of nanorods comprising forming a nanorod layer having surface phonon polariton coupling properties dependent upon a coupling length in the nanorod layer corresponding to a scale of surface phonon polariton propagation, wherein the coupling length scale is proportional to a distance between centers of neighboring nanorods.

23. The method of claim 16, wherein the providing the aligned deposit of the nanorods comprises forming a coating of nanorods having a thickness that is less than a surface phonon polariton wavelength and with surface phonon polariton coupling properties comprising an electromagnetic field intensity limited by an enhancement factor.

24. The method of claim 16, wherein the microchannel has a water contact angle about 85°.

* * * * *